United States Patent
Kaneko et al.

(10) Patent No.: US 10,926,253 B2
(45) Date of Patent: Feb. 23, 2021

(54) PROCESS FOR PRODUCING ION EXCHANGE MEMBRANE FOR ELECTROLYSIS, AND ION EXCHANGE MEMBRANE FOR ELECTROLYSIS

(71) Applicant: AGC Inc., Chiyoda-ku (JP)

(72) Inventors: Takayuki Kaneko, Chiyoda-ku (JP); Hiromitsu Kusano, Chiyoda-ku (JP); Yasushi Yamaki, Chiyoda-ku (JP); Takuo Nishio, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 469 days.

(21) Appl. No.: 15/728,694

(22) Filed: Oct. 10, 2017

(65) Prior Publication Data

US 2018/0043344 A1 Feb. 15, 2018

Related U.S. Application Data

(63) Continuation of application No. PCT/JP2016/061696, filed on Apr. 11, 2016.

(30) Foreign Application Priority Data

Apr. 13, 2015 (JP) ............................ JP2015-081944

(51) Int. Cl.
*B01J 39/05* (2017.01)
*B01J 39/20* (2006.01)
(Continued)

(52) U.S. Cl.
CPC ............... *B01J 39/05* (2017.01); *B01J 39/04* (2013.01); *B01J 39/20* (2013.01); *B01J 47/12* (2013.01);
(Continued)

(58) Field of Classification Search
CPC ... B01J 39/05; B01J 39/04; B01J 39/20; B01J 47/12; C08J 5/22; C08J 5/2281;
(Continued)

(56) References Cited

U.S. PATENT DOCUMENTS

| 5,384,019 A | 1/1995 | Keating et al. |
| 2012/0234674 A1* | 9/2012 | Kameyama ............. C25B 13/02 204/252 |
| 2014/0360868 A1 | 12/2014 | Yamaki et al. |

FOREIGN PATENT DOCUMENTS

| CN | 103243345 | 8/2013 |
| CN | 103243347 | 8/2013 |

(Continued)

OTHER PUBLICATIONS

International Search Report dated May 17, 2016 in PCT/JP2016/061696, filed on Apr. 11, 2016.

*Primary Examiner* — Nicholas A Smith
(74) *Attorney, Agent, or Firm* — Oblon, McClelland, Maier & Neustadt, L.L.P.

(57) ABSTRACT

To provide a process for producing an ion exchange membrane for electrolysis which has a low membrane resistance and which is capable of reducing the electrolysis voltage during the electrolysis, even if the membrane strength is increased, an ion exchange membrane for electrolysis, a precursor membrane of an ion exchange membrane for electrolysis, and an electrolysis apparatus.

In a fluorinated polymer having groups convertible to ion exchange groups, a reinforcing fabric 20A formed by weaving covered yarns 21 each comprising a reinforcing fabric 22 and a sacrificial material covering at least a portion of the outer peripheral surface of the reinforcing yarn 22, to produce a precursor membrane of an ion exchange membrane, and from the precursor membrane, at least a portion of the sacrificial material in the reinforcing fabric is eluted (Continued)

to form a reinforcing material and at the same time, the groups convertible to ion exchange groups are converted to ion exchange groups, to produce an ion exchange membrane for electrolysis.

8 Claims, 3 Drawing Sheets

(51) Int. Cl.
  $B01J\ 47/12$ (2017.01)
  $C25B\ 13/08$ (2006.01)
  $D02G\ 3/36$ (2006.01)
  $D02G\ 3/04$ (2006.01)
  $B01J\ 39/04$ (2017.01)
  $C08J\ 5/22$ (2006.01)
  $C25B\ 13/02$ (2006.01)
  $C25B\ 1/46$ (2006.01)
  $C25B\ 9/08$ (2006.01)

(52) U.S. Cl.
  CPC .............. *C08J 5/22* (2013.01); *C08J 5/2281* (2013.01); *C25B 1/46* (2013.01); *C25B 9/08* (2013.01); *C25B 13/02* (2013.01); *C25B 13/08* (2013.01); *D02G 3/04* (2013.01); *D02G 3/36* (2013.01); *C08J 2327/18* (2013.01); *C08J 2329/10* (2013.01); *C08J 2367/02* (2013.01)

(58) Field of Classification Search
  CPC ................ C08J 2327/18; C08J 2329/10; C08J 2367/02; C25B 1/46; C25B 9/08; C25B 13/02; C25B 13/08; D02G 3/04; D02G 3/36
  See application file for complete search history.

(56) References Cited

FOREIGN PATENT DOCUMENTS

| | | |
|---|---|---|
| CN | 103668319 | 3/2014 |
| JP | 2004-43594 | 2/2004 |
| JP | 2013-163859 | 8/2013 |
| JP | 2013-163860 | 8/2013 |
| JP | 2014-58707 | 4/2014 |

\* cited by examiner

PROCESS FOR PRODUCING ION EXCHANGE MEMBRANE FOR ELECTROLYSIS, AND ION EXCHANGE MEMBRANE FOR ELECTROLYSIS

TECHNICAL FIELD

The present invention relates to a process for producing an ion exchange membrane for electrolysis, an ion exchange membrane for electrolysis, a precursor membrane of an ion exchange membrane for electrolysis, and an electrolysis apparatus.

BACKGROUND ART

As an ion exchange membrane to be used in a method of electrolysis of e.g. an alkali chloride for producing an alkali hydroxide and chlorine by electrolyzing an aqueous alkali chloride solution such as seawater, an electrolyte membrane composed of a fluorinated polymer having ion-exchange groups (e.g. carboxylic acid functional groups or sulfonic acid functional groups) is known.

In order to maintain the mechanical strength and dimensional stability, such an ion exchange membrane is usually reinforced by a reinforcing fabric formed by weaving reinforcing yarns (such as polytetrafluoroethylene (PTFE) yarns). However, with an ion-exchange membrane having a reinforcing fabric formed by weaving reinforcing yarns such as PTFE yarns, the membrane resistance tends to be high, and the electrolysis voltage tends to increase.

Therefore, a method of producing a reinforcing fabric formed by interweaving reinforcing yarns such as PTFE yarns and sacrificial yarns (polyethylene terephthalate (PET) yarns) dissolved in an alkaline aqueous solution, and embedding the reinforcing fabric in the membrane has been proposed (e.g. Patent Document 1). The sacrificial yarns in the reinforcing fabric are eluted in the following stages (i) and (ii), and the reinforcing fabric embedded in the membrane finally becomes a reinforcing material consisting solely of the reinforcing yarns. Accordingly, by using sacrificial yarns and reinforcing yarns in combination, an increase of the membrane resistance in the alkali chloride electrolysis can be suppressed.

(i) A stage where a precursor membrane of an ion exchange membrane having a precursor membrane containing a fluorinated polymer having groups convertible to ion exchange groups reinforced by the reinforcing fabric is immersed in an alkaline aqueous solution to hydrolyze and convert the groups convertible to ion exchange groups, to ion exchange groups.

(ii) A stage where the ion exchange membrane is disposed in an electrolytic cell and a conditioning operation before the main operation of the alkali chloride electrolysis is conducted, and an initial stage of the main operation.

PRIOR ART DOCUMENT

Patent Document

Patent Document 1: JP-A-2004-43594

DISCLOSURE OF INVENTION

Technical Problem

In order to enhance the membrane strength of the ion exchange membrane produced by using a reinforcing fabric formed by interweaving reinforcing yarns and sacrificial yarns, it is preferred to further narrow the spacing between reinforcing yarns. However, if the spacing between reinforcing yarns is narrowed, the membrane resistance will increase, and the electrolysis voltage becomes high. Therefore, it is difficult to reduce the electrolysis voltage, while increasing the membrane strength of the ion exchange membrane.

It is an object of the present invention to provide a process for producing an ion exchange membrane for electrolysis such as electrolysis of an aqueous alkali chloride solution, which has a low membrane resistance and which is capable of reducing the electrolysis voltage during the electrolysis, even if the membrane strength is increased, an ion exchange membrane for electrolysis, a precursor membrane of an ion exchange membrane for electrolysis, and an electrolysis apparatus provided with an ion exchange membrane for electrolysis.

Solution to Problem

The present invention has the following constructions.
[1] A process for producing an ion exchange membrane for electrolysis, which comprises a step (a) of embedding, in a fluorinated polymer having groups convertible to ion exchange groups, a reinforcing fabric precursor formed by weaving covered yarns each comprising a reinforcing yarn and a sacrificial material covering at least a portion of the outer peripheral surface of the reinforcing yarn, to produce a precursor membrane of an ion exchange membrane for electrolysis, and a step (b) of eluting, from the precursor membrane of an ion exchange membrane for electrolysis, at least a portion of the sacrificial material in the reinforcing fabric precursor and at the same time, converting the groups convertible to ion exchange groups to ion exchange groups.
[2] The process according to [1], wherein the covered yarns are covered twisted yarns each having the reinforcing yarn as a core yarn and a wrap yarn composed of a sacrificial material wound on at least a portion of the outer peripheral surface of the core yarn.
[3] The process according to [1] or [2], wherein between the outer peripheral surface of at least a portion of the reinforcing yarns and the fluorinated polymer, a region (p) which is either a region (p1) formed by a void or a region (p2) formed by a void and the sacrificial material, is continuously formed from a first edge side toward a second edge side in a longitudinal direction of the reinforcing yarn.
[4] The process according to [3], wherein the region (p) is formed in a tubular form along the longitudinal direction of the reinforcing yarn on the outer peripheral surface of the reinforcing yarn or is formed in a spiral form so as to be wound on the outer peripheral surface of the reinforcing yarn.
[5] The process according to [3] or [4], wherein in a cross section at right angles to the lengthwise direction of at least a portion of the reinforcing yarns, the following angle (x) of a portion facing the above region (p) based on the outer periphery of the reinforcing yarn, is from 60 to 360°:
  angle (x): an angle formed by two lines drawn from a centroid Pc of the reinforcing yarn in the cross section so as to sandwich a portion (T) facing the region (p) formed on the outer peripheral surface of the reinforcing yarn; in a case where there are two or more portions (T), the angle (x) is the sum of the angles corresponding to the respective portions (T); and in a case where the portion (T) is present on the entire outer periphery of the reinforcing yarn, the angle (x) is 360°.

[6] The process according to any one of [3] to [5], wherein in a cross section at right angles to the lengthwise direction of at least a portion of the reinforcing yarns, the ratio of a cross sectional area (y2) of the region (p) formed on the outer periphery of the reinforcing yarn to the sum of a cross sectional area (y1) of the reinforcing yarn and the cross sectional area (y2) of the region (p), i.e. [y2/(y1+y2)] is from 5 to 50%.

[7] The process for producing an ion exchange membrane for electrolysis according to any one of [1] to [6], wherein the thickness of the reinforcing fabric is from 10 to 300 μm.

[8] The process according to any one of [1] to [7], wherein the reinforcing fabric is a reinforcing fabric formed by weaving the covered yarns and sacrificial yarns composed of the sacrificial material, and at least a portion of the sacrificial yarns is eluted in the step (b).

[9] The process for producing an ion exchange membrane for electrolysis according to any one of [1] to [8], wherein the ion exchange membrane is used to electrolyze an aqueous alkali chloride solution.

[10] An ion exchange membrane for electrolysis, which comprises a fluorinated polymer having ion exchange groups and a reinforcing material embedded in the fluorinated polymer, wherein between the fluorinated polymer and an outer peripheral surface of at least a portion of reinforcing yarns among reinforcing yarns constituting the reinforcing material, a region (p) which is either a region (p1) formed by a void or a region (p2) formed by a void and a sacrificial material is continuously formed from a first edge side toward a second edge side in the longitudinal direction of the reinforcing yarns.

[11] The ion exchange membrane for electrolysis according to [10], wherein the region (p) is formed in a tubular form along the longitudinal direction of the reinforcing yarn on the outer peripheral surface of the reinforcing yarn or is formed in a spiral form so as to be wound on the outer peripheral surface of the reinforcing yarn.

[12] The ion exchange membrane for electrolysis according to [10] or [11], wherein in a cross section at right angles to the lengthwise direction of at least a portion of the reinforcing yarns, the following angle (x), of a portion facing the above region (p) based on the outer periphery of the reinforcing yarn, is from 60 to 360°:

angle (x): an angle formed by two lines drawn from a centroid Pc of the reinforcing yarn in the cross section so as to sandwich a portion (T) facing the region (p) formed on the outer peripheral surface of the reinforcing yarn; in a case where there are two or more portions (T), the angle (x) is the sum of the angles corresponding to the respective portions (T); and in a case where the portion (T) is present on the entire outer periphery of the reinforcing yarn, the angle (x) is 360°.

[13] The ion exchange membrane for electrolysis according to any one of [10] to [12], which has a thickness of from 150 to 350 μm.

[14] The ion exchange membrane for electrolysis according to any one of [10] to [13], wherein in a cross section at right angles to the lengthwise direction of at least a portion of the reinforcing yarns, the ratio of a cross sectional area (y2) of the region (p) formed on the outer periphery of the reinforcing yarn to the sum of a cross sectional area (y1) of the reinforcing yarn and the cross sectional area (y2) of the region (p), i.e. [y2/(y1+y2)] is from 5 to 50%.

[15] The ion exchange membrane for electrolysis according to any one of [10] to [14], which is used to electrolyze an aqueous alkali chloride solution.

[16] A precursor membrane of an ion exchange membrane for electrolysis, which comprises a fluorinated polymer having groups convertible to ion exchange groups and a reinforcing fabric embedded in the fluorinated polymer, wherein the reinforcing fabric is a reinforcing fabric formed by weaving covered yarns each comprising a reinforcing yarn and a sacrificial material covering at least a portion of the outer peripheral surface of the reinforcing yarn.

[17] The precursor membrane of an ion exchange membrane for electrolysis according to [16], which is used to electrolyze an aqueous alkali chloride solution.

[18] An electrolysis apparatus comprising an electrolytic cell provided with a cathode and an anode, and the ion exchange membrane for electrolysis as defined in any one of [10] to [15] disposed in the electrolytic cell so as to partition inside of the electrolytic cell into a cathode chamber on the cathode side and an anode chamber on the anode side.

[19] The electrolysis apparatus according to [18], which is used to electrolyze an aqueous alkali chloride solution.

Advantageous Effects of Invention

According to the present invention, it is possible to provide a process for producing an ion exchange membrane for electrolysis such as electrolysis of an aqueous alkali chloride solution or water electrolysis of e.g. an alkali hydroxide, which has a low membrane resistance and which is capable of reducing the electrolysis voltage during the electrolysis, even if the membrane strength is increased, an ion exchange membrane for electrolysis, a precursor membrane of an ion exchange membrane for electrolysis, and an electrolysis apparatus provided with an ion exchange membrane for electrolysis.

DESCRIPTION OF EMBODIMENTS

Figure 1:
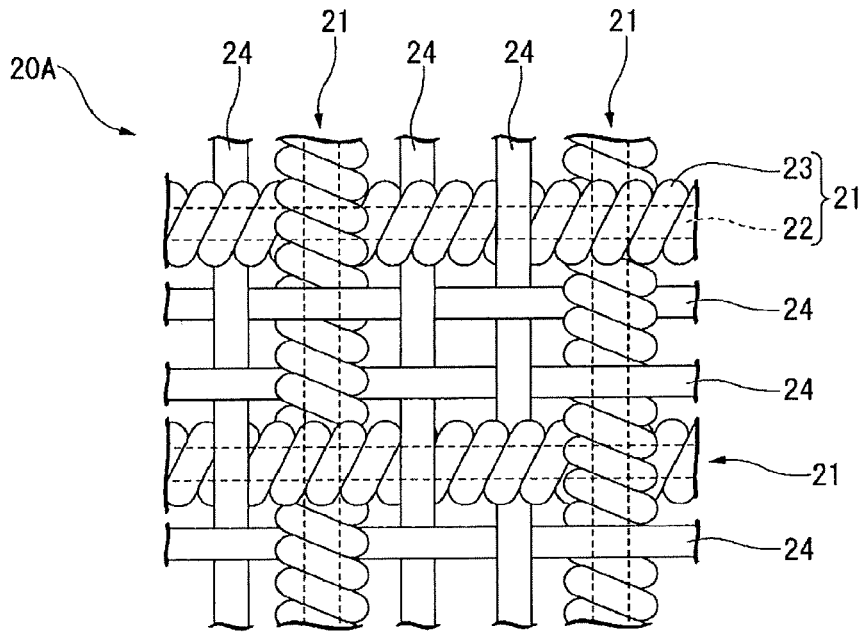
FIG. 1 is a plan view schematically illustrating a reinforcing fabric used in the process for producing an ion exchange membrane of the present invention.

The following definitions of terms apply throughout the present specification including claims.

An "ion exchange group" may, for example, be a carboxylic acid functional group or a sulfonic acid functional group.

A "carboxylic acid functional group" means a carboxylic acid group (—COOH) or a carboxylate group (—COOM$^1$, wherein M$^1$ is an alkali metal or a quaternary ammonium cation).

A "sulfonic acid functional group" means a sulfonic acid group (—SO$_3$H) or a sulfonate group (—SO$_3$M$^2$, wherein M$^2$ is an alkali metal or a quaternary ammonium cation).

A "group convertible to an ion exchange group" means a group which can be converted to an ion exchange group by a known treatment such as hydrolysis treatment, acid form treatment, etc.

A "fluorinated polymer" means a polymer compound having fluorine atom(s) in the molecule.

A "perfluorocarbon polymer" means a polymer wherein all of hydrogen atoms bonded to carbon atoms in the polymer are substituted by fluorine atoms. Some of the fluorine atoms in the perfluorocarbon polymer may be substituted by chlorine atom(s) or bromine atom(s).

A "fluorinated monomer" means a monomer having fluorine atom(s) in the molecule.

A "fluorinated olefin" means a compound wherein at least one hydrogen atom in an olefin ($C_nH_{2n}$) is substituted by a fluorine atom.

A "unit" means a moiety derived from a monomer present in a polymer to constitute the polymer. Further, a unit obtained by chemically converting a structure of a certain unit after forming a polymer may also be referred to as a unit. In the following, in some cases, units derived from an individual monomer may be represented by a name having the monomer's name followed by "units".

A "reinforcing fabric" means a fabric which is used as a raw material for a reinforcing material to improve the strength of an ion exchange membrane. The "reinforcing fabric" is formed by weaving covered yarns each comprising a reinforcing yarn and a sacrificial material covering at least a portion of the outer peripheral surface of the reinforcing yarn. The reinforcing fabric may be formed by weaving only covered yarns, or may be formed by interweaving the covered yarns and at least one of the reinforcing yarns and sacrificial yarns.

A "sacrificial material" means one which will be eluted in an alkaline aqueous solution (e.g. an aqueous sodium hydroxide solution with a concentration of 32 mass % at 90° C.) when the precursor membrane of an ion exchange membrane is immersed therein. When the sacrificial material can be eluted in the aqueous sodium hydroxide solution, at least a portion of the sacrificial material is eluted in an alkaline aqueous solution when the groups convertible to ion exchange groups are converted to ion exchange groups. Further, the dissolution residue of the sacrificial material will be completely eluted in the alkaline aqueous solution and be removed when the ion exchange membrane is disposed in an electrolytic cell and, in the case of electrolysis of an alkali chloride, a conditioning operation is conducted before the main operation of the electrolysis or at the time of the subsequent main operation.

A "reinforcing yarn" is a yarn constituting the reinforcing fabric and means a yarn composed of a material which will not be eluted even if immersed in an aqueous sodium hydroxide solution (e.g. an aqueous solution with a concentration of 32 mass %). Even after immersing a reinforcing precursor membrane composed of a fluorinated polymer having a reinforcing fabric embedded therein, in an alkaline aqueous solution, whereby the sacrificial yarns are eluted from the reinforcing fabric, it remains undissolved as a yarn constituting the reinforcing material and maintains the mechanical strength and dimensional stability of the ion exchange membrane. It means a yarn which maintains the mechanical strength and dimensional stability of an ion exchange membrane as a remaining yarn constituting the reinforcing fabric after a portion of the sacrificial yarns is eluted, or all of the sacrificial yarns are eluted.

A "reinforcing material" means a material formed of reinforcing yarns and optionally contained sacrificial yarns derived from a reinforcing fabric, which is formed by immersing a precursor membrane of an ion exchange membrane having a reinforcing fabric embedded therein, in an aqueous alkaline solution, so that at least a portion of the sacrificial yarns in the reinforcing fabric is eluted. When a portion of the sacrificial yarns is dissolved, the reinforcing material will be composed of the reinforcing yarns and dissolution residues of the sacrificial yarns, and when all of the sacrificial yarns are dissolved, the reinforcing material will be composed solely of the reinforcing yarns. Reinforcing yarns constituting the reinforcing material are derived from a reinforcing fabric and are thus comprise warps and wefts. These warps and wefts are usually at right angles to each other and are, respectively, present in parallel with the MD direction and the TD direction of the ion exchange membrane.

Here, the MD (Machine Direction) is a direction in which, in the production of an ion exchange membrane, a precursor membrane, a reinforcing precursor membrane and an ion exchange membrane are conveyed. The TD (Transverse Direction) is a direction perpendicular to the MD direction.

An "elution part" means a hole to be formed as a result of elution of one sacrificial yarn when the yarn is immersed in an aqueous sodium hydroxide solution (e.g. an aqueous solution with a concentration of 32 mass %). In a case where the one sacrificial yarn is a monofilament, at least a portion of the material of the monofilament will be eluted, whereby one hole will be formed in the ion exchange membrane. In a case where one sacrificial yarn is a multifilament, at least a portion of the multifilament will be eluted, whereby a collection of a plurality of holes will be formed in the ion exchange membrane, and this collection of a plurality of holes is an elution hole.

An "aperture ratio" means a ratio of the area of the portion excluding the reinforcing yarns, to the area in the surface direction of the reinforcing material.

A "precursor membrane of an ion exchange membrane for electrolysis" means a membrane having a reinforcing fabric embedded in a membrane comprising a fluorinated polymer having groups convertible to ion exchange groups. It may be a membrane composed of a single layer of a fluoropolymer or may be a membrane composed of a plurality of such layers.

<Process for Producing Ion Exchange Membrane for Electrolysis>

[Step (a)]

In the step (a), the method of embedding a reinforcing fabric in a fluorinated polymer having groups convertible to ion exchange groups is not particularly limited, and preferred is a method of disposing and laminating the reinforcing fabric between two layers of a fluorinated polymer having groups convertible to ion exchange groups.

The step (a) preferably comprises, for example, the following steps (a1) to (a4).

Step (a1): A reinforcing fabric is woven by using covered yarns each comprising a reinforcing yarn and a sacrificial material covering at least a portion of the outer peripheral surface of the reinforcing yarn, and sacrificial yarns composed of a sacrificial material.

Step (a2): A laminate of a precursor layer (C') composed of a fluorinated polymer having groups convertible to carboxylic acid functional groups (ion exchange groups) and a precursor layer (S'-1) composed of a fluorinated polymer having groups convertible to sulfonic acid functional groups (ion exchange groups) is produced.

Step (a3): A precursor layer (S'-2) composed of a fluorinated polymer having groups convertible to sulfonic acid functional groups is produced.

Step (a4): The reinforcing fabric obtained in the step (a1), the laminate obtained in the step (a2) and the precursor layer (S'-2) obtained in the step (a3) are disposed in the order of the precursor layer (S'-2), the reinforcing fabric, the precursor layer (S'-1) and the precursor layer (C'), laminated and united.

By carrying out the step (a) comprising the above steps (a1) to (a4) and the after-mentioned step (b), an ion exchange membrane for electrolysis having a layer (S-2) composed of a fluorinated polymer having sulfonic acid functional groups, the reinforcing material, a layer (S-1) composed of a fluorinated polymer having sulfonic acid functional groups and a layer (C) composed of a fluorinated polymer having carboxylic acid functional groups laminated in this order is obtained.

In the above example, in the step (a1), the reinforcing fabric is formed by using also sacrificial yarns composed of the sacrificial material, however, as described hereinafter, it may be formed by weaving only covered yarns, or may be formed by weaving covered yarns, reinforcing yarns and sacrificial yarns. With a view to lowering the electrolysis voltage, the reinforcing fabric is preferably a fabric formed by interweaving covered yarns and sacrificial yarns. Further, the position where the reinforcing fabric is disposed in the laminate is not limited to the above example and may be properly changed depending upon the design of the membrane.

[Step (a1)]

In the step (a1), for example, a reinforcing fabric 20A shown in FIG. 1 is woven.

The reinforcing fabric 20A in FIG. 1 is a plain weave fabric formed by weaving (interweaving) covered yarns 21 and sacrificial yarns 24.

(Covered Yarn)

Figure 2:
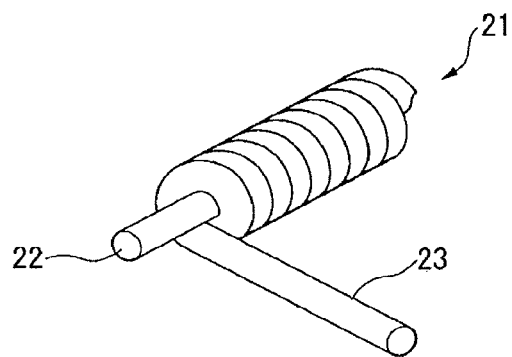
FIG. 2 is partial exploded perspective view schematically illustrating a covered twist yarn (covered yarn) used for production of the reinforcing fabric in FIG. 1.

A covered yarn is a yarn comprising a reinforcing yarn and a sacrificial material covered at least a portion of the outer peripheral surface of the reinforcing yarn. The reinforcing yarn and the sacrificial material are in a direct contact. For example, in the reinforcing fabric 20A in FIG. 1, as the covered yarn 21, the covered twisted yarn shown in FIG. 2 is used. The covered twisted yarn comprises a reinforcing yarn 22 as a core yarn and a wrap yarn 23 composed of the sacrificial material spirally wound on the reinforcing yarn 22. Further, the covered yarn may be one having at least a portion of the outer peripheral surface of the reinforcing yarn coated with the sacrificial material.

The reinforcing yarn 22 as the core yarn of the covered yarn 21 constitutes the reinforcing material together with the sacrificial yarns which remain and are optionally contained in the ion exchange membrane for electrolysis produced by the production process of the present invention, and maintains the mechanical strength and dimensional stability of the ion exchange membrane.

The reinforcing yarns 22 are preferably ones having durability against high temperature, chlorine, sodium hypochlorite and sodium hydroxide in e.g. the alkali chloride electrolysis.

As the reinforcing yarns 22, from the viewpoint of mechanical strength, heat resistance and chemical resistance, yarns comprising a fluorinated polymer are preferred, yarns comprising a perfluorocarbon polymer are more preferred, yarns comprising PTFE are further preferred, and PTFE yarns composed solely of PTFE are particularly preferred.

The reinforcing yarns 22 may be monofilaments or may be multifilaments. In a case where the reinforcing yarns 22 are PTFE yarns, from such a viewpoint that spinning is easy, monofilaments are preferred, and tape yarns obtained by slitting a PTFE film are more preferred. The reinforcing yarns such as tape yarns may be twisted.

In a case where the reinforcing yarns are twisted yarns, the number of twisting is preferably from 100 to 3,000 times/m, more preferably from 450 to 2,000 times/m, particularly preferably from 450 to 2,000 times/m. When the number of twisting is at least the lower limit value of the above range, the after-described aperture ratio of the obtainable reinforcing fabric tends to be high, the membrane resistance of an ion exchange membrane can be suppressed sufficiently low, and increase of the electrolysis voltage can be sufficiently suppressed. When the number of twisting of the reinforcing yarns is at most the upper limit value of the above range, yarn breakage or untwisting will hardly occur, and weaving properties will be excellent.

The fineness of the reinforcing yarns 22 is preferably from 50 to 200 denier, more preferably from 80 to 150 denier. When the fineness of the reinforcing yarns 22 is at least the lower limit value of the above range, the mechanical strength will be sufficiently high. When the fineness of the reinforcing yarns 22 is at most the upper limit value of the above range, the membrane resistance of the obtainable ion exchange membrane can be suppressed sufficiently low, and increase of the electrolysis voltage can be sufficiently suppressed. Further, the reinforcing yarns 22 will be less likely to be too close to the surface of the electrolyte membrane, whereby cracking is less likely to occur at the surface of the electrolyte membrane, and as a result, lowering of the mechanical strength can be prevented.

The wrap yarn 23 of the covered yarn 21 is a yarn composed of a sacrificial material and in the step (b) after the step (a), at least a portion thereof is eluted in an alkaline aqueous solution. As a result, in the obtained ion exchange membrane, a region (p) which is either a region (p1) formed by a void caused by elution of the wrap yarn 23 (hereinafter sometimes referred to as "elution part (α)") or a region (p2) formed by the elution part (α) and the sacrificial material remaining undissolved is continuously formed from a first edge side toward a second edge side in the longitudinal direction of the reinforcing yarn 22, between the fluorinated polymer and the outer peripheral surface of the reinforcing yarn 22.

By disposing such an ion exchanged membrane having the elution part (α) formed therein in an electrolytic cell and conducting alkali chloride electrolysis, an aqueous alkali chloride solution infiltrates into the elution part (α), and the membrane resistance at the portion decreases. The vicinity of the reinforcing fabric 22 is a portion considered to be least likely to carry electricity in the ion exchange membrane. Accordingly, by such an elution part (α) formed between the fluorinated polymer and the outer peripheral surface of the reinforcing yarn 22 which is in the vicinity of the reinforcing fabric 22, the electrolysis voltage when the ion exchange membrane is used for the electrolysis can be effectively decreased.

In a case where all of the wrap yarns 23 in the reinforcing fabric 20A are eluted, in the ion exchange membrane, the region (p1) composed of the elution part (α) is continuously formed as the region (p). On the other hand, in a case where only a portion of the wrap yarns 23 in the reinforcing fabric 20A is eluted, in the ion exchange membrane, the region (p2) composed of the elution part (α) and the sacrificial material remaining undissolved is continuously formed as the region (p). The remaining sacrificial material is completely eluted in an alkaline aqueous solution and is finally removed when the ion exchange membrane is disposed in an electrolytic cell and a conditioning operation before the main operation of alkali chloride electrolysis is conducted or at the time of the main operation after the conditioning operation.

The sacrificial material is preferably at least one member selected from the group consisting of PET, polybutylene terephthalate (hereinafter sometimes referred to as "PBT"), polytrimethylene terephthalate (hereinafter sometimes referred to as "PTT"), rayon and cellulose. The wrap yarn 23 composed of the sacrificial material is more preferably a PET yarn composed solely of PET, a PET/PBT yarn composed of a mixture of PET and PBT, a PBT yarn composed solely of PBT, or a PTT yarn composed solely of PTT.

Among them, a PET yarn is preferred in view of the cost. Preferred is a PBT yarn or a PTT yarn, a portion of which is likely to remain in the ion exchange membrane even after the step (b) and which can contribute to the mechanical strength of the ion exchange membrane, and particularly preferred is a PTT yarn. In view of the balance between the cost and the mechanical strength of the ion exchange membrane, preferred is a PET/PBT union yarn.

The wrap yarn 23 may be a monofilament or may be a multifilament. A multifilament is preferred in that the contact area with the alkaline aqueous solution tends to be large, and the wrap yarn 23 is easily eluted in the alkaline aqueous solution. In the case of the multifilament, the number of filaments per one wrap yarn 23 is preferably from 2 to 96, more preferably from 6 to 32, further preferably from 6 to 12. When the number filaments is at least the lower limit value of the above range, the wrap yarn 23 is easily eluted in the alkaline aqueous solution, and when it is at most the upper limit value of the above range, the fineness of the wrap yarn will not be high more than necessary.

The fineness of the wrap yarn 23 may be determined depending upon e.g. the size of the reinforcing yarn 22 so that the after-mentioned ratio [y2'/(y1'+y2')] will be within the preferred range. For example, the fineness of the wrap yarn 23 is preferably from 7 to 80 denier, more preferably from 10 to 40 denier, further preferably from 20 to 35 denier. When the fineness is at least the lower limit value of the above range, the region (p) having the elution part (α) can be sufficiently formed between the fluorinated polymer and the outer peripheral surface of the reinforcing yarn 22 in the obtained ion exchange membrane, and the electrolysis voltage during the electrolysis can be sufficiently reduced. When the fineness is at most the upper limit value of the above range, the volume of the region (p) which does not contribute to ion exchange can be moderately suppressed.

Figure 3A:
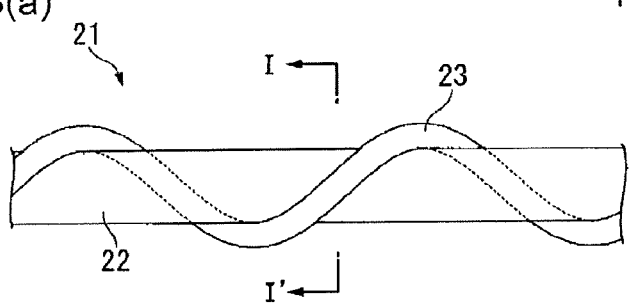
FIG. 3(a) is a plan view schematically illustrating another example of a covered twisted yarn (covered yarn)
Figure 3B:
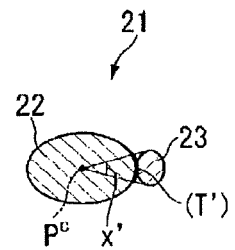
FIG. 3(b) is a cross-sectional view along the line I-I' in FIG. 3(a).
Figure 4A:
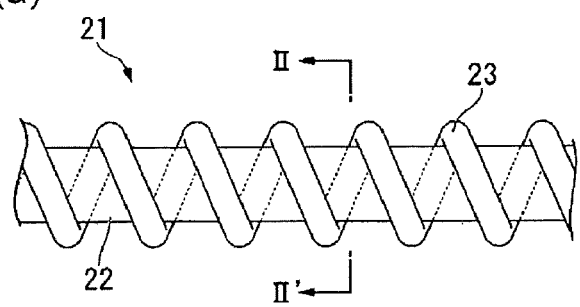
FIG. 4(a) is a plan view schematically illustrating still another example of a covered twisted yarn (covered yarn)

As the covered yarn 21, not only the covered twisted yarn comprising the reinforcing yarn 22 as a core yarn and the wrap yarn 23 spirally wound on the outer peripheral surface of the core yarn densely and tightly as shown in FIG. 2, but also a covered twisted yarn comprising the reinforcing yarn 22 as a core yarn and a wrap yarn 23 composed of the sacrificial material spirally wound on the outer peripheral surface of the core yarn with gaps as shown in FIGS. 3 and 4 may be used.

Further, as the covered twisted yarn, not only a single covered twisted yarn comprising the wrap yarn 23 single wound on the outer peripheral surface of the reinforcing yarn 22 as shown in FIGS. 2 to 4, but also a double covered twisted yarn having the wrap yarn 23 double wound or a covered twisted yarn having the wrap yarn triple or more wound may be used, and such can be determined depending upon e.g. the fineness of the wrap yarn.

In a case where as the covered yarn 21, as shown in FIG. 2, a covered twisted yarn comprising the reinforcing yarn 22 as a core yarn and the wrap yarn 23 spirally wound on the outer peripheral surface of the core yarn densely and tightly is used, the region (p) in the obtained ion exchange membrane is formed in a tubular form along the longitudinal direction of the reinforcing yarn 22 (specifically, in a tubular form around the reinforcing yarn 22) between the fluorinated polymer and the outer peripheral surface of the reinforcing yarn 22.

On the other hand, in a case where as the covered yarn, as shown in FIGS. 3 and 4, a covered twisted yarn comprising the reinforcing yarn 22 as a core yarn and the wrap yarn 23 spirally wound on the outer peripheral surface of the core yarn with gaps is used, the region (p) in the obtained ion exchange membrane is formed in a spiral form so as to be wound on the outer periphery of the reinforcing yarn 22 between the fluorinated polymer and the outer peripheral surface of the reinforcing yarn 22.

In any case of the covered yarns 21 in FIGS. 2 to 4, in a case where all of the wrap yarns 23 are eluted, the region (p) to be formed is the region (p1), and in a case where only a portion of the wrap yarns 23 is eluted, the region (p) to be formed is the region (p2).

As the covered yarn, e.g. a core-wrap yarn having a wrap layer composed of the sacrificial material formed on the entire outer peripheral surface of the core yarn by a coating method such as dip coating may also be used, and the covered yarn is not limited to the covered twisted yarn. In a case where such a core-wrap yarn is used as the covered yarn, the region (p) in the obtained ion exchange membrane is formed in a tubular form along the longitudinal direction of the reinforcing yarn (specifically, in a tubular form around the reinforcing yarn) between the fluorinated polymer and the outer peripheral surface of the reinforcing yarn. In a case where all of the wrap layer is eluted, the region (p) to be formed is the region (p1), and in a case where only a portion of the wrap layer is eluted, the region (p) to be formed is the region (p2).

The "covered yarn" in the present invention does not include a "piled yarn" having a yarn composed of e.g. PTFE which functions as a reinforcing yarn and a yarn composed of e.g. PET which functions as a sacrificial yarn gathered and twisted. Since in the "piled yarn", the respective yarns are twisted together and the reinforcing yarn is bent, if a fabric produced by using the piled yarn is used as the reinforcing fabric, the dimensional stability of the ion exchange membrane will decrease.

Further, the "covered twisted yarn" comprises a core yarn which extends straight unbent and a wrap yarn wound around the core yarn, and is different from the "piled yarn" comprising a plurality of yarns twisted together, each yarn being bent.

The covered yarn 21 is preferably one having the following angle (x') of from 60 to 360°. The angle (x') is more preferably from 100 to 360°, further preferably from 200 to 360°, particularly preferably from 300 to 360°. When the angle (x') of the covered yarn is at least the lower limit value of the above range, the region (p) having the elution part (α) can be sufficiently formed between the fluorinated polymer and the outer peripheral surface of the reinforcing yarn by eluting the sacrificial material covering the reinforcing yarn in the covered yarn, and the electrolysis voltage during the electrolysis can be further reduced.

Angle (x'): An angle formed by two lines drawn from a centroid of the reinforcing yarn in a cross section at right angles to the lengthwise direction of the covered yarn, so as to sandwich a portion (T') at which the sacrificial material provided on the outer periphery of the reinforcing yarn is present. In a case where there are two or more portions (T'), the angle (x') is the sum of the angles corresponding to the respective portions (T'). In a case where the portion (T') is present on the entire outer periphery of the reinforcing yarn, the angle (x') is 360°.

The way to determine the angle (x') will be specifically described with reference to FIGS. 3 and 4.

As shown in FIG. 3(b), the cross section at right angles to the lengthwise direction of the covered yarn (covered twisted yarn) 21 is observed with an optical microscope, and in the cross section, two straight lines are drawn from a centroid Pc of the reinforcing yarn 22 so as to sandwich a portion (T') at which the sacrificial material (that is, the wrap yarn 23) provided on the outer periphery of the reinforcing yarn 22 is present. The angle formed by the two lines is the angle (x').

Figure 4B:
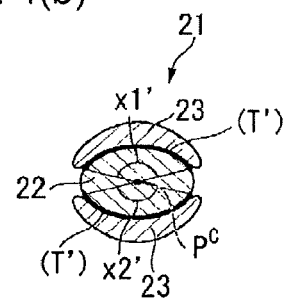
FIG. 4(b) is a cross-sectional view along the line II-II' in FIG. 4(a).

Otherwise, as shown in FIG. 4(b), in a cross section at right angles to the lengthwise direction of the covered yarn 21, in a case where there are two or more (two in FIG. 4) portions (T') at which the wrap yarn 23 is present, angles (the angle (x1') and the angle (x2') in FIG. 4(b)) corresponding to the respective portions (T') are measured, and the sum of the angles (that is, (x1'+x2')) is taken as the angle (x').

Measurement is carried out using an image analysis software with respect to cross sections at randomly selected 10 points of the covered yarn, and the average of the angles obtained with respect to the cross sections at the 10 points is taken as the angle (x').

The observation with an optical microscope may be conducted with respect to a cross section obtained by embedding the covered yarn in a resin and cutting the covered yarn together with the resin. Otherwise, a precursor membrane of an ion exchange membrane produced by using the covered yarn is cut, and the above observation and measurement may be conducted with respect to the obtained cross section of the covered yarn.

The angle (x') is 360° in a case where the portion (T') is present on the entire outer periphery of the reinforcing yarn 22 as in the case of the covered twisted yarn comprising the reinforcing yarn 22 as a core yarn and the wrap yarn 23 composed of the sacrificial material wound on the outer peripheral surface of the core yarn densely and tightly as shown in FIG. 2, or as in the case of the core-wrap yarn comprising the reinforcing yarn as a core yarn and a wrap layer composed of the sacrificial material formed on the entire outer peripheral surface of the core yarn formed by e.g. a dip coating method.

The covered yarn 21 is preferably such that in the cross section at right angles to the lengthwise direction of the covered yarn 21, the ratio of a cross sectional area (y2') of a portion at which the sacrificial material is present formed on the outer periphery of the reinforcing yarn 22 to the sum of a cross sectional area (y1') of the reinforcing yarn 22 and the cross sectional area (y2') at which the sacrificial material is present, i.e. [y2'/(y1'+y2')] is from 5 to 50%, more preferably from 20 to 40%.

When the ratio [y2'/(y1'+y2')] is at least the lower limit value of the above range, in the obtained ion exchange membrane, the region (p) having the elution part (α) can be sufficiently formed between the fluorinated polymer and the outer peripheral surface of the reinforcing yarn 22, and the electrolysis voltage during the electrolysis can be sufficiently lowered. When the ratio is at most the upper limit value of the above range, the volume of the region (p) which does not contribute to the ion exchange can be moderately suppressed.

Measurement of the cross sectional area (y1') of the reinforcing yarn 22 in the covered yarn 21 and the cross sectional area (y2') of the portion at which the sacrificial material is present formed on the outer periphery of the reinforcing yarn 22, is carried out in the same manner as determination of the angle (x') by using an image analysis software with respect to cross-sections of the covered yarn at randomly selected 10 points by observation with an optical microscope. The average of the ratios of the cross-sectional areas of the cross-sections at the 10 points is taken as the ratio [y2'/(y1'+y2')].

The observation with an optical microscope may be conducted with respect to a cross-section obtained by embedding the covered yarn in a resin and cutting the covered yarn together with the resin. Otherwise, a precursor membrane of an ion exchange membrane produced by using the covered yarn is cut, and the observation and measurement may be conducted with respect to the obtained cross-section of the covered yarn.

The angle (x') with respect to the covered yarn and the after-described angle (x) of an ion exchange membrane produced by using the covered yarns are substantially the same. Further, the ratio [y2'/(y1'+y2')] with respect to the covered yarn and the after-described ratio [y2/(y1+y2)] of an ion exchange membrane produced by using the covered yarns are substantially the same. The angle (x') with respect to an ion exchange membrane precursor corresponds to the angle (x) of an ion exchange membrane having the region (p) having the elution part (α) formed by the step (b) of eluting at least a portion of the sacrificial yarns. Accordingly, the angle (x') agrees with the angle (x).

(Sacrificial Yarn)

A sacrificial yarn 24 is a yarn composed of the sacrificial material. Accordingly, at least a portion of the sacrificial yarns 24 is eluted in an alkaline aqueous solution in the subsequent step (b). As a result, a linear region (q) which is either a region (q1) formed by a void caused by elution of the sacrificial yarn 24 (hereinafter sometimes referred to as "elution part (β)") or a region (q2) formed by the elution part (β) and a portion of the sacrificial yarns 24 remaining undissolved is formed in the obtained ion exchange membrane.

By disposing such an ion exchange membrane having the elution part (β) formed in an electric cell and conducting alkali chloride electrolysis, an aqueous alkali chloride solution infiltrates into the elution part (β), and the membrane resistance at that portion decreases. Accordingly, the electrolysis voltage during the alkali chloride electrolysis can be lowered.

In a case where all of one sacrificial yarn 24 in the reinforcing fabric 20A is eluted, in the ion exchange membrane, the linear region (q1) composed of the elution part (β) is continuously formed as the region (q). On the other hand, in a case where only a portion of one sacrificial yarn 24 is eluted, in the ion exchange membrane, the linear region (q2) composed of the elution part (β) and the sacrificial material remaining undissolved (a portion of the sacrificial yarn 24) is continuously formed as the region (q). The remaining sacrificial yarn 24 is completely eluted in an alkaline aqueous solution and is finally removed when the ion exchange membrane is disposed in an electrolytic cell and a conditioning operation before the main operation of the alkali chloride electrolysis is carried out, or at the time of the main operation after the conditioning operation, and the linear region (q1) composed of the elution part (3) is continuously formed.

The sacrificial material is preferably the same material as the sacrificial material for the wrap yarn 23.

The sacrificial yarn 24 may be a multifilament having a plurality of filaments gathered or may be a monofilament. A multifilament is preferred in that the contact area with an alkaline aqueous solution becomes wider, and such a sacrificial yarn 24 will be easily eluted in an alkaline aqueous solution.

In a case where the sacrificial yarn 24 is a multifilament, the number of filaments per one sacrificial yarn 24 is preferably from 2 to 32, more preferably from 2 to 16, further preferably from 2 to 8. When the number of filaments is at least the above lower limit value, a sacrificial yarn 24 will be easily eluted in an alkaline aqueous solution. When the number of filaments is at most the above upper limit value, the fineness of the sacrificial yarn 24 will not be high more than necessary.

The fineness of the sacrificial yarns 24 is preferably from 1 to 60 denier, more preferably from 10 to 40 denier, further preferably from 20 to 35 denier. When the fineness of the sacrificial yarns 24 is at least the lower limit value of the above range, the mechanical strength will be sufficiently high, and, at the same time, weaving properties will be sufficiently high. When the fineness of the sacrificial yarns 24 is at most the upper limit value of the above range, an elution part (β) to be formed by elution of the sacrificial yarns is less likely to be too close to the surface of the electrolyte membrane 10, and cracking is less likely to occur at the surface of the electrolyte membrane 10, and as a result, lowering of the mechanical strength can be prevented.

(Reinforcing Fabric)

The density (the number of implantation) of the covered yarns 21 in the reinforcing fabric 20A is preferably from 10 to 50 yarns/inch, more preferably from 20 to 40 yarns/inch. When the density of the reinforcing yarns 21 is at least the lower limit value of the above range, the mechanical strength as a reinforcing material will be sufficiently high. When the density of the covered yarns 21 is at most the upper limit value of the above range, the membrane resistance of the ion exchange membrane can be suppressed to be sufficiently low, and an increase of the electrolysis voltage can be sufficiently suppressed.

The density (the number of implantation) of the sacrificial yarns 24 in the reinforcing fabric 20A is preferably an even multiple of the density of the covered yarns 21. Specifically, the density of the sacrificial yarns 24 is preferably two, four, six, eight or ten times the density of the covered yarns 21. When it is an odd multiple, the covered yarns as the warps and wefts will not cross vertically alternately in plain weaving, and accordingly a fabric texture will not be formed after elution of the sacrificial yarns 24.

The total density of the covered yarns 21 and the sacrificial yarns 24 is preferably from 60 to 200 yarns/inch, from the viewpoint of easiness of weaving and less likeliness of misalignment.

The reinforcing fabric 20A is preferably such that the aperture ratio of the reinforcing material obtained from the reinforcing fabric 20A is from 60 to 90%, more preferably from 70 to 85%. When the aperture ratio of the reinforcing material is at least the lower limit value of the above range, the membrane resistance of the ion exchange membrane having the reinforcing material can be suppressed sufficiently low, and an increase of the electrolysis voltage can be sufficiently suppressed. When the aperture ratio of the reinforcing material is at most the above upper limit value, the mechanical strength as a reinforcing material will be sufficiently high.

The aperture ratio of the reinforcing material is a proportion (%) of an area of an aperture not occupied with the reinforcing yarn 22 to the area (top-viewed area) of the reinforcing material obtained by immersing the reinforcing fabric 20A in an alkaline aqueous solution to completely dissolved the sacrificial material of the covered yarns 21 and the sacrificial yarns 24 so that only the reinforcing yarns 22 remain, observed from a direction at right angles to the fabric surface. The fabric surface is observed with an optical microscope, and the area is measured by an image analysis software.

The thickness of the reinforcing fabric 20A is preferably from 10 to 300 µm, more preferably from 80 to 240 µm, particularly preferably from 140 to 220 µm. When the thickness of the reinforcing fabric 20A is at least the lower limit value of the above range, the reinforcing material obtainable from the reinforcing fabric 20A has a sufficiently high mechanical strength as a reinforcing material. When the thickness of the reinforcing fabric 20A is at most the above upper limit value, the thickness at the yarn intersections can be suppressed, and it is possible to sufficiently suppress the influence to raise the electrolysis voltage due to current shielding in the obtainable reinforcing material.

The thickness of the reinforcing fabric can be measured by a thickness measuring apparatus for fabric.

The reinforcing fabric 20A shown in FIG. 1 is one formed by weaving the covering yarns 21 and the sacrificial yarns 24, however, the reinforcing fabric used in the present invention is not limited so long as it is formed by weaving at least the covered yarns 21. By using at least the covered yarns 21, at least a portion of the wrap yarn 23 in the covered yarn 21 is eluted in the step (b), and the elution part (α) constituting the region (p1) or (p2) is formed. The elution part (α) is, as described above, formed in the vicinity of the reinforcing yarn 22 which is considered to be least likely to carry electricity, and accordingly a great effect to decrease the electrolysis voltage during the electrolysis tends to be obtained.

The reinforcing fabric may be formed by weaving only covered yarns or may be formed by weaving covered yarns, reinforcing yarns and sacrificial yarns, however, by using a reinforcing fabric 20A formed by weaving the covered yarns 21 and the sacrificial yarns 24 in combination as shown in FIG. 1, the membrane strength of an obtainable ion exchange membrane will be increased and an excellent effect to suppress the membrane resistance to be lower will be achieved.

That is, by using the sacrificial yarns 24 in combination for forming the reinforcing fabric 20A, at least a portion of the sacrificial yarn 24 is eluted in the step (b), and the elution part (13) which contributes to an effect to lower the electrolysis voltage is formed. Further, by making a portion of the sacrificial yarn 24 remain in the obtainable ion exchange membrane, breakage such as cracking is less likely to occur in the ion exchange membrane at the time of handling the ion exchange membrane until it is dispersed in an electrolytic cell, or at the time of installation of the ion exchange membrane in an electrolytic cell.

[Step (a2)]

In the step (a2), a laminate of a precursor layer (C') composed of a fluorinated polymer having groups convertible to carboxylic acid functional groups and a precursor layer (S'-1) composed of a fluorinated polymer having groups convertible to sulfonic acid functional groups, is produced.

(Fluorinated Polymer Having Groups Convertible to Carboxylic Acid Functional Groups)

The fluorinated polymer having groups convertible to carboxylic acid functional groups may, for example, be a copolymer having units derived from a fluorinated monomer having a group convertible to a carboxylic acid functional group and units derived from a fluorinated olefin.

The fluorinated monomer having a group convertible to a carboxylic acid functional group is not particularly limited so long as it is a compound having one or more fluorine atoms in the molecule, an ethylenic double bond, and a group convertible to a carboxylic acid functional group, and it is possible to use a conventional one.

As the fluorinated monomer having a group convertible to a carboxylic acid functional group, a fluorovinyl ether represented by the following formula (3) is preferred from the viewpoint of the production cost, the reactivity with other monomers and excellent properties of the obtainable fluorinated polymer.

$$CF_2=CF—(O)_p—(CF_2)_q—(CF_2CFX)_r—(O)_s—(CF_2)_t—(CF_2CFX')_u-A^1 \quad (3)$$

In the formula (3), X is a fluorine atom or a trifluoromethyl group. X' is a fluorine atom or a trifluoromethyl group. In a case where both X and X' are present in one molecule, they may be the same or different.

$A^1$ is a group convertible to a carboxylic acid functional group, and is a functional group convertible to a carboxylic acid functional group by hydrolysis. $A^1$ may, for example, be —CN, —COF, —COOR$^1$ (wherein R$^1$ is a $C_{1-10}$ alkyl group), —COONR$^2$R$^3$ (wherein R$^2$ and R$^3$ are each a hydrogen atom or a $C_{1-10}$ alkyl group, and R$^2$ and R$^3$ may be the same or different), etc.

p is 0 or 1, q is an integer from 0 to 12, r is an integer of from 0 to 3, s is 0 or 1, t is an integer of from 0 to 12, and u is an integer of from 0 to 3. However, p and s are not 0 at the same time, and r and u are not 0 at the same time. That is, $1 \leq p+s$, and $1 \leq r+u$.

As specific examples of the fluorovinyl ether of the formula (3), the following compounds may be mentioned. From the viewpoint of easy production, a compound wherein p=1, q=0, r=1, s=0 to 1, t=1 to 3 and u=0 to 1, is preferred.

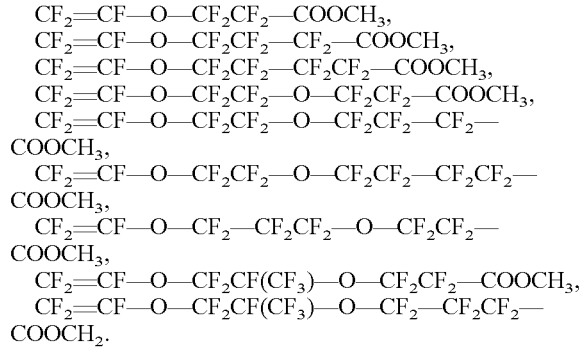

CF$_2$=CF—O—CF$_2$CF$_2$—COOCH$_3$,
CF$_2$=CF—O—CF$_2$CF$_2$—CF$_2$—COOCH$_3$,
CF$_2$=CF—O—CF$_2$CF$_2$—CF$_2$CF$_2$—COOCH$_3$,
CF$_2$=CF—O—CF$_2$CF$_2$—O—CF$_2$CF$_2$—COOCH$_3$,
CF$_2$=CF—O—CF$_2$CF$_2$—O—CF$_2$CF$_2$—CF$_2$—COOCH$_3$,
CF$_2$=CF—O—CF$_2$CF$_2$—O—CF$_2$CF$_2$—CF$_2$CF$_2$—COOCH$_3$,
CF$_2$=CF—O—CF$_2$—CF$_2$CF$_2$—O—CF$_2$CF$_2$—COOCH$_3$,
CF$_2$=CF—O—CF$_2$CF(CF$_3$)—O—CF$_2$CF$_2$—COOCH$_3$,
CF$_2$=CF—O—CF$_2$CF(CF$_3$)—O—CF$_2$—CF$_2$CF$_2$—COOCH$_2$.

As the fluorinated monomer having a group convertible to a carboxylic acid functional group, one type may be used alone, or two or more types may be used in combination.

The fluorinated olefin may, for example, be a $C_{2-3}$ fluoroolefin having one or more fluorine atoms in the molecule. As such a fluoroolefin, tetrafluoroethylene (CF$_2$=CF$_2$) (hereinafter referred to as "TFE"), chlorotrifluoroethylene (CF$_2$=CFCl), vinylidene fluoride (CF$_2$=CH$_2$), vinyl fluoride (CH$_2$=CHF), hexafluoropropylene (CF$_2$=CFCF$_3$), etc. may be mentioned. Among them, TFE is particularly preferred from the viewpoint of the production cost of the monomer, the reactivity with other monomers and excellent properties of the obtainable fluorinated polymer.

As the fluorinated olefin, one type may be used alone, or two or more types may be used in combination.

For the production of the fluorinated polymer to form the precursor layer (C'), in addition to the fluorinated monomer having a group convertible to a carboxylic acid functional group and the fluorinated olefin, other monomers may further be used. Such other monomers may, for example, be CF$_2$=CF$_2$—R$^f$, CF$_2$=CF—OR$^f$ (wherein R$^f$ is a perfluoroalkyl group having from 1 to 10 carbon atoms), CF$_2$=CFO(CF$_2$)$_v$CF=CF$_2$ (wherein v is an integer of from 1 to 3), etc. By copolymerizing other monomers, it is possible to improve flexibility and mechanical strength of the ion exchange membrane. The proportion of other monomers is preferably at most 30 mass % in the total monomers (100 mass %) with a view to maintaining the ion exchange performance.

The ion exchange capacity of the fluorinated polymer having groups convertible to carboxylic acid functional groups is, in a case where the ion exchange membrane is used for alkali chloride electrolysis, preferably from 0.5 to 2.0 meq/g dry resin. The ion exchange capacity is preferably at least 0.6 meq/g dry resin, more preferably at least 0.7 meq/g dry resin, from the viewpoint of mechanical strength and electrochemical performance as an ion exchange membrane.

With respect to the molecular weight of the fluorinated polymer having groups convertible to carboxylic acid functional groups, from the viewpoint of mechanical strength and membrane-forming ability as an ion exchange membrane, the TQ value is preferably at least 150° C., more preferably from 170 to 340° C., further preferably from 170 to 300° C.

The TQ value is a value related to the molecular weight of a polymer, and is one represented by a temperature showing a volume flow rate: 100 mm$^3$/sec. The volume flow rate is one obtained by letting a polymer be melted and flow out from an orifice (diameter: 1 mm, length: 1 mm) at a constant temperature under a pressure of 3 MPa and representing the amount of the flowing out polymer by a unit of mm$^3$/sec. The TQ value serves as an index for the molecular weight of the polymer and indicates that the higher the TQ value, the higher the molecular weight.

(Fluorinated Polymer Having Groups Convertible to Sulfonic Acid Functional Groups)

The fluorinated polymer having groups convertible to sulfonic acid functional groups may, for example, be a copolymer having units derived from a fluorinated monomer having a group convertible to a sulfonic acid functional group and units derived from a fluorinated olefin.

The fluorinated monomer having a group convertible to a sulfonic acid functional group is not particularly limited so long as it is a compound having one or more fluorine atoms in the molecule, an ethylenic double bond and a group convertible to a sulfonic acid functional group, and a conventional one may be employed.

As the fluorinated monomer having a group convertible to a sulfonic acid functional group, from the viewpoint of the production cost, the reactivity with other monomers and excellent properties of the obtainable fluorinated polymer, a compound represented by the following formula (4) or a compound represented by the following formula (5) is preferred.

$$CF_2=CF-O-R^{f2}-A^2 \quad (4)$$

$$CF_2=CF-R^{f2}-A^2 \quad (5)$$

$R^{f2}$ is a perfluoroalkylene group having from 1 to 20 carbon atoms, may contain an etheric oxygen atom, and may be straight-chained or branched.

$A^2$ is a group convertible to a sulfonic acid functional group. The group convertible to a sulfonic acid functional group is a functional group that can be converted to a sulfonic acid functional group by hydrolysis. The functional group that can be converted to a sulfonic acid functional group may, for example, be $-SO_2F$, $-SO_2Cl$, $-SO_2Br$, etc.

As the compound represented by the formula (4), the following compounds are specifically preferred.

$CF_2=CF-O-(CF_2)_a-SO_2F$ (wherein a is an integer of from 1 to 8), $CF_2=CF-O-CF_2CF(CF_3)O(CF_2)_a-SO_2F$ (wherein a is an integer of from 1 to 8), $CF_2=CF[OCF_2CF(CF_3)]_aSO_2F$ (wherein a is an integer of from 1 to 5).

As the compound represented by the formula (5), the following compounds are specifically preferred.

$CF_2=CF(CF_2)_b-SO_2F$ (wherein b is an integer of from 1 to 8), $CF_2=CF-CF_2-O-(CF_2)_b-SO_2F$ (wherein b is an integer of from 1 to 8).

As the fluorinated monomer having a group convertible to a sulfonic acid functional group, from such a viewpoint that synthesis is easy, the following compounds are more preferred.

$CF_2=CFOCF_2CF_2SO_2F$,
$CF_2=CFOCF_2CF_2CF_2SO_2F$,
$CF_2=CFOCF_2CF_2CF_2CF_2SO_2F$,
$CF_2=CFOCF_2CF(CF_3)OCF_2CF_2SO_2F$,
$CF_2=CFOCF_2CF(CF_3)OCF_2CF_2CF_2SO_2F$,
$CF_2=CFOCF_2CF(CF_3)SO_2F$,
$CF_2=CFCF_2CF_2SO_2F$,
$CF_2=CFCF_2CF_2CF_2SO_2F$,
$CF_2=CF-CF_2-O-CF_2CF_2-SO_2F$.

As the fluorinated monomer having a group convertible to a sulfonic acid functional group, one type may be used alone, or two or more types may be used in combination.

The fluorinated olefin may be those exemplified above, and from the viewpoint of the production cost of the monomer, the reactivity with other monomers and excellent properties of the obtainable fluorinated polymer, TFE is particularly preferred. As the fluorinated olefin, one type may be used alone, or two or more types may be used in combination.

For the production of the fluorinated polymer to form the precursor layer (S'-1), in addition to the fluorinated monomer having a group convertible to a sulfonic acid functional group and the fluorinated olefin, other monomers may further be used. Such other monomers may be those exemplified above. By copolymerizing other monomers, it is possible to improve flexibility and mechanical strength of the ion exchange membrane. The proportion of other monomers is preferably at most 30 mass % in all monomers (100 mass %) with a view to maintaining the ion exchange performance.

The ion exchange capacity of the fluorinated polymer having groups convertible to sulfonic acid functional groups is, in a case where the ion exchange membrane is used for alkali chloride electrolysis, preferably from 0.5 to 2.0 meq/g dry resin. The ion exchange capacity is preferably at least 0.6 meq/g dry resin, more preferably at least 0.7 meq/g dry resin, from the viewpoint of mechanical strength and electrochemical performance as an ion exchange membrane.

With respect to the molecular weight of the fluorinated polymer having groups convertible to sulfonic acid functional groups, from the viewpoint of mechanical strength and membrane-forming ability as an ion exchange membrane, the TQ value is preferably at least 150° C., more preferably from 170 to 340° C., further preferably from 170 to 300° C.

(Production of Laminate)

The laminate of the precursor layer (C') and the precursor layer (S'-1) may be produced, for example, by co-extrusion. Co-extrusion may be conducted by a known method.

The thickness of the precursor layer (C') is preferably from 5 to 50 μm, more preferably from 10 to 35 μm. When the thickness of the precursor layer (C') is at least the lower limit value of the above range, the obtainable ion exchange membrane is likely to exhibit a high current efficiency. Further, in a case where electrolysis of sodium chloride is conducted, it is possible to reduce the amount of sodium chloride in sodium hydroxide as the product. When the thickness of the precursor layer (C') is at most the upper limit value of the above range, the membrane resistance of the obtainable ion exchange membrane can be suppressed to be low, and the electrolysis voltage tends to be low.

The thickness of the layer (S'-1) is preferably from 30 to 140 μm, more preferably from 30 to 100 μm. When the thickness of the layer (S'-1) is at least the lower limit value of the above range, the mechanical strength of the obtainable ion exchange membrane will be sufficiently high. When the thickness of the layer (S'-1) is at most the upper limit value of the above range, the membrane resistance of the obtainable ion exchange membrane can be suppressed to be low, and the electrolysis voltage is likely to be low.

[Step (a3)]

In the step (a3), a precursor layer (S'-2) composed of a fluorinated polymer having groups convertible to sulfonic acid functional groups is produced, for example, by a single layer extrusion method. The fluorinated polymer having groups convertible to sulfonic acid functional groups may, for example, be one exemplified as the fluorinated polymer constituting the precursor layer (S'-1).

The single layer extrusion method may be conducted by a known method.

The thickness of the layer (S'-2) is preferably from 10 to 60 μm, more preferably from 10 to 40 μm. When the thickness of the layer (S'-2) is at least the lower limit value of the above range, the reinforcing fabric fits into the electrolyte membrane in the obtainable ion exchange membrane thereby to improve peeling resistance of the reinforcing fabric. Further, the reinforcing fabric will not be too close to the surface of the electrolyte membrane, whereby cracking is less likely to occur on the surface of the electrolyte membrane, and as a result, lowering of the mechanical strength can be prevented. When the thickness of the layer (S'-2) is at most the upper limit value of the above range, the membrane resistance of the obtainable ion exchange membrane can be suppressed to be sufficiently low, and the electrolysis voltage tends to be low.

[Step (a4)]

Figure 5:
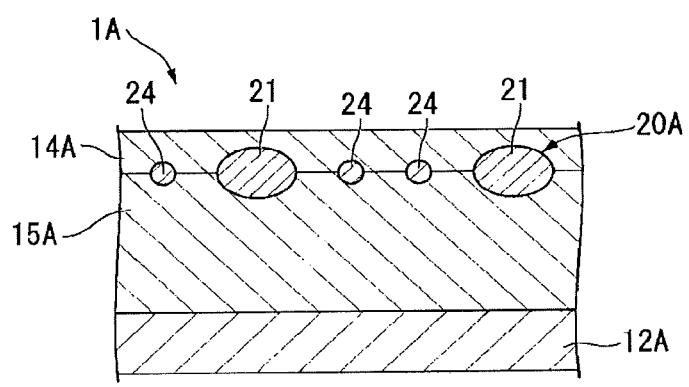
FIG. 5 is a schematic cross-sectional view illustrating the precursor membrane of an ion exchange membrane for electrolysis of the present invention.

In the step (a4), as shown in FIG. 5, the precursor layer (S'-2) 14A, the reinforcing fabric 20A, the precursor layer (S'-1) 15A and the precursor layer (C') 12A are disposed in this order and laminated by a known laminating apparatus such as a laminating roll or a vacuum laminating apparatus and united. By such an operation, a precursor membrane 1A of an ion exchange membrane shown in FIG. 5, comprising a fluorinated polymer having groups convertible ion exchange groups, and a reinforcing fabric 20A formed by weaving covered yarns 21 each comprising a reinforcing yarn 22 and a sacrificial material covering at least a portion of the outer peripheral surface of the reinforcing yarn 22, embedded in the fluorinated polymer, can be produced.

FIG. 5 is a schematic cross-sectional view of the precursor membrane 1A of an ion exchange membrane at right angles to the lengthwise direction of the covered yarns 21 at a position where the sacrificial yarn 24 disposed in a direction crossing the covered yarns 21 is not present. Further, the actual cross-section of the covered yarn varies e.g. depending upon the state of the covered yarn (whether it is a covered twisted yarn or a core-wrap yarn) as shown in FIGS. 3(b) and 4(b), the above-described angle (x') or ratio [y2'/(y1'+y2')], and in FIG. 5, it is simplified and represented in an elliptic form.

[Step (b)]

In the step (b), from the precursor membrane 1A of an ion exchange membrane obtained in the step (a), at least a portion of the sacrificial material (the wrap yarn 23 in the covered yarn 21 and the sacrificial yarn 24) in the reinforcing fabric 20A is eluted and at the same time, the groups convertible to ion exchange groups in the precursor layer (S'-2), the precursor layer (S'-1) and the precursor layer (C') are converted to ion exchange groups, to obtain an ion exchange membrane.

Specifically, in the step (b), the precursor membrane 1A of an ion exchange membrane is brought into contact with an alkaline aqueous solution. By contact with an alkaline aqueous solution, the sacrificial material (the wrap yarn 23 in the covered yarn 21 and the sacrificial yarn 24) contained in the reinforcing fabric 20A in the precursor membrane 1A of an ion exchange membrane is eluted, and the reinforcing fabric 20A is converted to a reinforcing material.

Further, the groups convertible to carboxylic acid functional groups in the precursor layer (C') and the groups convertible to sulfonic acid functional groups in the precursor layer (S'-2) and the precursor layer (S'-1) are hydrolyzed and converted to carboxylic acid functional groups and sulfonic acid functional groups, respectively. In such a manner, an electrolyte membrane composed of a laminate of layers (S-2) and (S-1) composed of a fluorinated polymer having sulfonic acid functional groups and a layer (C) composed of a fluorinated polymer having carboxylic acid functional groups can be obtained.

The layer (C) functions as a functional layer which express a high current efficiency, and the layers (S-2) and (S-1) function as a layer which maintains the mechanical strength.

In the step (b), as described above, so long as at least a portion of the sacrificial material (the wrap yarn 23 in the covered yarn 21 and the sacrificial yarn 24) is eluted, a portion of the sacrificial material may remain in an ion exchange membrane obtained via the step (b). The degree of elution of the sacrificial material can be controlled by adjusting e.g. the material of the sacrificial material, the number of filaments of the wrap yarn 23 and the sacrificial yarn 24, and the conditions of the step (b). When the sacrificial material remains, breakage such as cracking in the ion exchange membrane is more likely to be suppressed at the time of handling until disposition of the ion exchange membrane in an electrolytic cell or at the time of installation in the electrolytic cell.

The alkaline aqueous solution used in the step (b) may, for example, be a mixture of a water-soluble organic compound and a hydroxide of an alkali metal as disclosed in JP-A-03-6240.

<Ion Exchange Membrane for Electrolysis>

The ion exchange membrane of the present invention comprises a fluorinated polymer having ion exchange groups and a reinforcing material embedded in the fluorinated polymer, wherein between the fluorinated polymer (electrolyte membrane) and the outer peripheral surface of at least a portion of reinforcing yarns among reinforcing yarns constituting the reinforcing material, a region (p) which is either a region (p1) formed by a void or a region (p2) formed by a void and a sacrificial material is continuously formed from a first edge side toward a second edge side in the lengthwise direction of the reinforcing yarn. Here, the void constituting the regions (p1) and (p2) is the above-described elution part ($\alpha$) and the sacrificial material forming the region (p2) is the sacrificial material derived from the covered yarns.

The ion exchange membrane of the present invention may be produced by a production process comprising the above steps (a) and (b). That is, a precursor membrane 1A of an ion exchange membrane having a reinforcing fabric 20A formed by weaving covered yarns 21 each comprising a reinforcing yarn 22 and a sacrificial material covering at least a portion of the outer peripheral surface of the reinforcing yarn 22, embedded in a fluorinated polymer having groups convertible to ion exchange groups, is produced, and at least a portion of the sacrificial material is eluted from the precursor membrane 1A of an ion exchange membrane to form a void constituting the region (p), and at the same time, the groups convertible to ion exchange groups are converted to ion exchange groups, whereby the ion exchange membrane of the present invention can be obtained.

As described above, in a case where all of the wrap yarns 23 in the reinforcing fabric 20A are dissolved, in the ion exchange membrane, the region (p1) composed of the elution part ($\alpha$) is continuously formed as the region (p). On the other hand, in a case where only a portion of the wrap ions 23 in the reinforcing fabric 20A is dissolved, in the ion exchange membrane, the region (p2) composed of the elution part ($\alpha$) and the sacrificial material remaining undissolved is continuously formed as the region (p).

Further, as described above, the region (p) in the ion exchange membrane may be formed in a tubular form along the longitudinal direction of the reinforcing yarn (specifically, in a tubular form around the reinforcing yarn); or in a spiral form so as to be wound on the outer periphery of the reinforcing yarn. The form of the region (p) is determined, as described above, depending upon the form of the covered yarns used for production of the ion exchange membrane.

The ion exchange membrane of the present invention is preferably such that the angle (x) defined below is from 60 to 360°. The angle (x) is more preferably from 100 to 360°, further preferably from 200 to 360°, particularly preferably from 300 to 360°. When the angle (x) is at least the lower limit value of the above range, the region (p) having the elution part ($\alpha$) can be sufficiently formed between the fluorinated polymer and the outer peripheral surface of the reinforcing yarn, and the electrolysis voltage at the time of electrolysis can be further decreased.

Here, the following cross section is a cross section at a position where the region (q) formed along the direction crossing the reinforcing yarns is not present.

Angle (x): An angle formed by two lines drawn from a centroid of the reinforcing fiber in the cross section at right angles to the lengthwise direction of the reinforcing yarn having the region (p) formed between its outer peripheral surface and the fluorinated polymer, so as to sandwich a portion (T) facing the region (p) formed on the outer periphery of the reinforcing yarn. In a case where there are two or more portions (T), the angle (x) is the sum of the angles corresponding to the respective portions (T). In a case where the portion (T) is present on the entire outer periphery of the reinforcing yarn, the angle (x) is 360°.

The way to determine the angle (x) will be described specifically with reference to FIGS. 6(a) and 6(b).

Figure 6A:
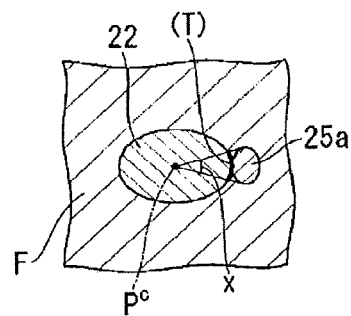
FIG. 6(a) is a schematic cross-sectional view illustrating an example of a way to determine the angle (x) of an ion exchange membrane for electrolysis.

As shown in FIG. 6(a), the cross section at right angles to the lengthwise direction of a reinforcing yarn 22 having a region (p) 25a formed between its outer peripheral surface and the fluorinated polymer F, is observed with an optical microscope, and in the cross section, two lines are drawn from a centroid of the reinforcing yarn 22 so as to sandwich a portion (T) facing the region (p) 25a are drawn, and the angle sandwiched between the two lines is taken as the angle (x).

Figure 6B:
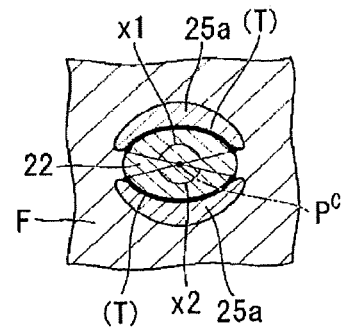
FIG. 6(b) is a schematic cross-sectional view illustrating another example of a way to determine the angle (x) of an ion exchange membrane for electrolysis.

Further, as shown in FIG. 6(b) for example, in a case where there are two or more (two in FIG. 6(b)) portions (T) facing the region (p) 25a, angles (the angle (x1) and the angle (x2) in FIG. 6(b)) corresponding to the respective portions (T) are measured, and the sum of the angles (that is, (x1+x2)) is taken as the angle (x).

Measurement is conducted using an image analysis software with respect to cross sections at randomly selected 10 points of the reinforcing yarn 22, and the average of values with respect to the cross sections at the 10 points is taken as the angle (x).

Further, the ion exchange membrane of the present invention is preferably such that in a cross section at right angles to the lengthwise direction of the reinforcing yarn 22 having the region (p) formed between its outer peripheral surface and the fluorinated polymer F, the ratio [y2/(y1+y2)] of a cross sectional area (y2) of the region (p) formed on the outer periphery of the reinforcing yarn 22 to the sum of a cross sectional area (y1) of the reinforcing yarn 22 and the cross sectional area (y2) of the region (p) is from 5 to 50%, more preferably from 20 to 40%.

When the ratio [y2/(y1+y2)] is at least the lower limit value of the above range, in the obtainable ion exchange membrane, the region (p) having the elution part (α) can be sufficiently formed between the outer peripheral surface of the reinforcing yarn 22 and the fluorinated polymer F, and the electrolysis voltage during the electrolysis can be sufficiently lowered. When the ratio [y2/(y1+y2)] is at most the upper limit value of the above range, the volume of the region (p) which does not contribute to the ion exchange can be moderately suppressed.

Here, the cross section is a cross section at a position where the region (q) formed along the direction crossing the reinforcing yarn 22 is not present.

Measurement of the cross sectional area (y1) of the reinforcing yarn 22 and the cross sectional area (y2) of the region (p) formed on the outer periphery of the reinforcing yarn 22 is carried out by using an image analysis software with respect to cross sections at randomly selected 10 points of the reinforcing yarn 22 and the region (p) by observation with an optical microscope, in the same manner as determination of the angle (x). And, the average of the ratios with respect to the cross sections at 10 points is taken as the ratio [y2/(y1+y2)].

Further, the angle (x) and the ratio [y2/(y1+y2)] with respect to the ion exchange membrane are measured and determined with respect to an ion exchange membrane dried at 90° C. for 2 hours.

As described above, the angle (x) in the ion exchange membrane is substantially the same as the above-described angle (x') with respect to the covered yarn used for production of the ion exchange membrane. Further, the ratio [y2/(y1+y2)] of the ion exchange membrane is substantially the same as the above-described ratio [y2'/(y1'+y2')] with respect to the covered yarn used for production of the ion exchange membrane.

The thickness of the ion exchange membrane is preferably from 150 to 350 μm, more preferably from 200 to 300 μm, particularly preferably from 240 to 300 μm. When the thickness of the ion exchange membrane is at least the lower limit value of the above range, the mechanical strength will be sufficiently high. When it is at most the above upper limit value, the influence to raise the electrolysis voltage can be sufficiently suppressed. The thickness of the ion exchange membrane was measured with respect to an ion exchange membrane dried at 90° C. for 2 hours.

Figure 7:
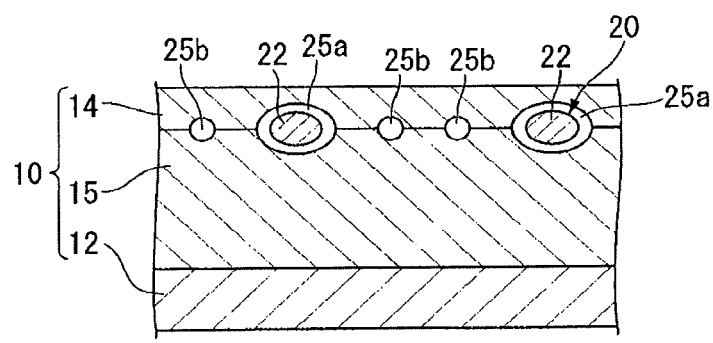
FIG. 7 is a schematic cross-sectional view illustrating an example of the ion exchange membrane for electrolysis of the present invention.

FIG. 7 is a schematic cross-sectional view showing an example of the ion exchange membrane of the present invention. The cross sectional view is a schematic cross-sectional view at a position at right angles to the lengthwise direction of the reinforcing yarn 22 having a region (p) 25a formed between its outer peripheral surface and the fluorinated polymer and at a position where a linear region (q) formed along the direction crossing the reinforcing yarn 22 is not present.

The region (p) 25a in FIG. 7 is present on the entire periphery of the reinforcing yarn 22, and the angle (x) is 360°. Such an ion exchange membrane having the angle (x) being 360° can be produced, as described above, by using, as the covered yarn, a covered twisted yarn comprising a reinforcing yarn 22 as a core yarn and a wrap yarn 23 composed of the sacrificial material wound on the outer peripheral surface of the core yarn densely and tightly, as shown in FIG. 2, or a core-wrap yarn comprising a reinforcing yarn as a core yarn and a wrap layer composed of the sacrificial material formed on the entire outer peripheral surface of the core yarn e.g. by a dip coating method.

Further, in FIG. 7, the reference symbol 25b is a linear region (q1) formed substantially in parallel with the lengthwise direction of the reinforcing yarn 22 between adjacent reinforcing yarns 22.

The electrolyte membrane 10 is, as described above, a laminate of the layer (S-2) 14, the layer (S-1) 15 and the layer (C) 12, and the reinforcing material 20 is disposed between the layer (S-2) 14 and the layer (S-1) 15 and embedded in the fluorinated polymer having sulfonic acid functional groups.

By such a region (p) 25a and a region (q) formed in the ion exchange membrane, when the ion exchange membrane is disposed in an electrolytic cell and alkali chloride electrolysis is carried out, an aqueous alkali chloride solution infiltrates into the elution part (α) constituting the region (p) and the elution part (β) constituting the region (q). Accordingly, in such an elution part (α) and an elution part (β), the electrical resistance is low. Accordingly, the membrane resistance of the ion exchange membrane can be decreased, and the electrolysis voltage during the electrolysis can be lowered. Particularly, since the elution part (α) is formed in the vicinity (on the outer periphery side) of the reinforcing yarn 22 which is considered to be least likely to carry electricity, the effect to reducing the electrolysis voltage during the electrolysis tends to be significant.

Here, each of the cross sections of the regions (q1) 25b is composed of one circle (hole) in FIG. 7, however, the form varies depending upon the number of filaments of the sacrificial yarn used for formation of the region (q1) 25b. In a case where the sacrificial yarn is composed of a monofilament, the cross section is composed of one circle as shown in FIG. 7, and in a case where the sacrificial yarn is a multifilament, the cross section comprises circles of the same number as the number of filaments of the multifilament, or such circles connected to one another. For example, in a case where the sacrificial yarn is a multifilament comprising two filaments, the region (q1) formed based on one sacrificial yarn has a shape having two circles connected to each other, corresponding to the two filaments.

Advantageous Effects

In a case where an ion exchange membrane is reinforced by a reinforcing material, the reinforcing yarns constituting the reinforcing material will prevent migration of cations such as sodium ions in the membrane. Accordingly, it is considered that the vicinity on the cathode side of the reinforcing yarns in the ion exchange membrane will be a region (hereinafter referred to as "current-shielding region") not substantially functioning as an electrolysis site. Therefore, if the density (the number of implantation) of the reinforcing yarns is increased by narrowing their spacing for the purpose of improving the membrane strength, the current-shielding region within the ion exchange membrane will be increased, whereby it is considered that the membrane resistance will increase, and the electrolysis voltage becomes high.

Whereas in the production process of the present invention, as a reinforcing fabric, a fabric formed by weaving at least covered yarns each comprising a reinforcing yarn and a sacrificial material covering at least a portion of the outer peripheral surface of the reinforcing yarn, is produced, which is disposed in a precursor membrane of an ion exchange membrane, and the sacrificial material in the reinforcing fabric is eluted.

By eluting the sacrificial material covering at least a portion of the outer peripheral surface of the reinforcing yarn in such a manner, the elution part (α) is formed between the outer peripheral surface of the reinforcing yarn and the fluorinated polymer. The vicinity of the reinforcing yarn is considered to be a current-shielding region which is least likely to carry electricity when the ion exchange membrane is disposed in an electrolytic cell and electrolysis is carried out, and it is considered that by forming the elution part (α) in the vicinity of the reinforcing yarn, an aqueous alkali chloride solution infiltrates into the elution part (α) and as a result, the membrane resistance will decrease.

According to such a production process of the present invention, the current-shielding region in the vicinity of the reinforcing yarn can be decreased without decreasing the density of the reinforcing yarns, and accordingly the electrolysis voltage during the alkali chloride electrolysis can be lowered while a sufficient membrane strength is secured.

Other Embodiment

The process for producing an ion exchange membrane, the ion exchange membrane and the precursor membrane of an ion exchange membrane of the present invention are not limited to the above-described embodiments.

For example, in the above example, a fabric formed by weaving covered yarns and sacrificial yarns is used as a reinforcing fabric, however, as described above, the reinforcing fabric may be a fabric formed by weaving only covered yarns, a fabric formed by weaving covered yarns and reinforcing yarns, or may be a fabric formed by weaving covered yarns, reinforcing yarns and sacrificial yarns. In a case where reinforcing yarns (yarns not covered with a sacrificial material) is used in combination for the reinforcing fabric, the region (p) will not be formed between the outer peripheral surface of the reinforcing yarns and the fluorinated polymer.

The reinforcing fabric is preferably a plain weave fabric but may be a twill fabric, a satin fabric or the like.

As the precursor layer composed of a fluorinated polymer having groups convertible to sulfonic acid functional groups, two precursor layers (S'-1) and (S'-2) are exemplified, however, the precursor layer is not limited to such an embodiment, and a layer of a single layer structure or a layer of three or more layer structure may be employed.

A reinforcing fabric is embedded in a fluorinated polymer having groups convertible to sulfonic acid functional groups, however, a fluorinated polymer having groups convertible to carboxylic acid functional groups may be embedded.

In the ion exchange membrane to be produced, the electrolyte membrane may be a single layer membrane, or may be a laminate having a layer (for example, a gas-releasing coating layer) other than the layers (C), (S-1) and (S-2).

<Electrolysis Apparatus>

Figure 8:
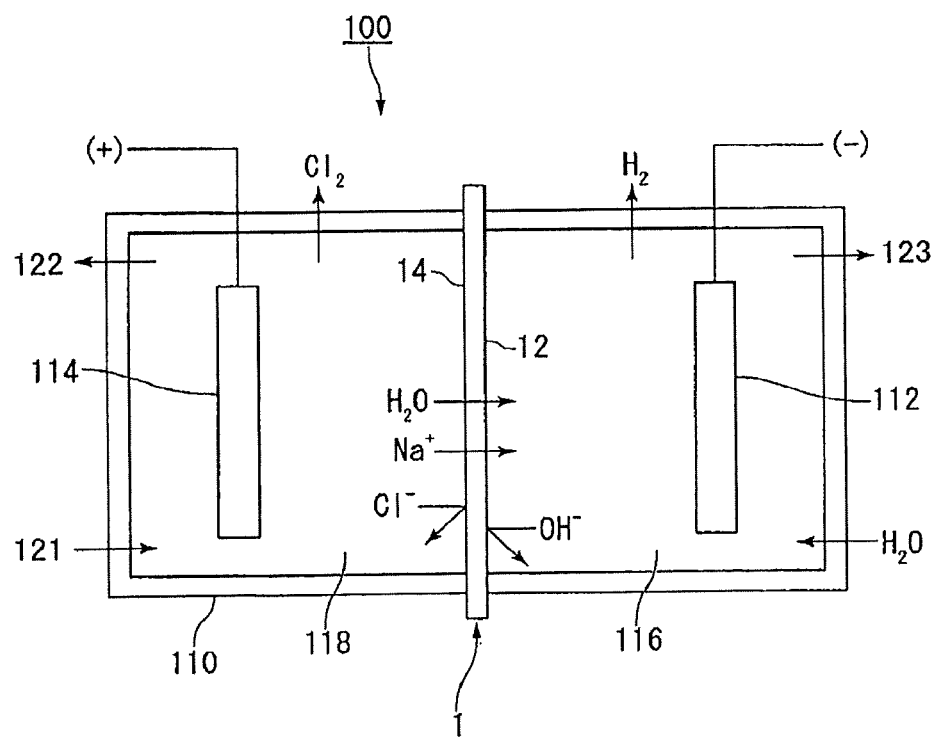
FIG. 8 is a schematic diagram showing an example of the alkali chloride electrolysis apparatus of the present invention.

For the electrolysis apparatus of the present invention, a known embodiment may be employed except for using the ion exchange membrane of the present invention. FIG. 8 is a schematic diagram showing an example of the alkali chloride electrolysis apparatus of the present invention.

The alkali chloride electrolysis apparatus 100 of this embodiment comprises an electrolytic cell 110 provided with a cathode 112 and an anode 114, and an ion exchange membrane 1 installed in the electrolytic cell 110 so as to partition inside of the electrolytic cell 110 into a cathode chamber 116 on the cathode 112 side and an anode chamber 118 on the anode 114 side.

The ion exchange membrane 1 is installed in the electrolytic cell 110 so that the layer (C) 12 is located on the cathode 112 side, and the layer (S-2) 14 is located on the anode 114 side.

The cathode 112 may be disposed in contact with the ion exchange membrane 1 or may be disposed with a space from the ion exchange membrane 1.

As the material constituting the cathode chamber 116, preferred is a material which is resistant to sodium hydroxide and hydrogen. As such a material, stainless steel, nickel, etc. may be mentioned.

As the material constituting the anode chamber 118, preferred is a material which is resistant to sodium chloride and chlorine. As such a material, titanium may be mentioned.

For example, in a case where an aqueous solution of sodium hydroxide is to be produced by electrolysis of an aqueous sodium chloride solution, by supplying an aqueous sodium chloride solution to the anode chamber 118 of the alkali chloride electrolysis apparatus 100, and supplying an aqueous sodium hydroxide solution to the cathode chamber 116, the aqueous sodium chloride solution is electrolyzed while maintaining the concentration of the aqueous sodium hydroxide solution discharged from the cathode chamber 116 at a predetermined concentration (e.g. 32 mass %).

According to the alkali chloride electrolysis apparatus of the present invention as described above, which comprises the ion exchange membrane for electrolysis of the present invention, it is possible to reduce the electrolysis voltage during the alkali chloride electrolysis while the membrane strength is made high.

EXAMPLES

In the following, the present invention will be described in detail with reference to Examples, but the present invention is not limited to the following description. Ex. 1 to 5 are Examples of the present invention, and Ex. 6 and 7 are Comparative Examples.

(TQ Value)

The flow rate to determine the TQ value is obtained by Shimadzu Flow Tester CFD-100D (manufactured by Shimadzu Corporation).

(Ion Exchange Capacity)

About 0.5 g of a fluorinated polymer having groups convertible to ion exchange groups was formed into a film by flat pressing at a temperature higher by about 10° C. than the TQ value of the polymer, and then, the film was analyzed by a transmission infrared spectroscopy apparatus, whereupon the ion exchange capacity was calculated by using the respective peak heights of $CF_2$ peak, $CF_3$ peak and OH peak, of the obtained spectra.

(Angle (x))

With respect to an ion exchange membrane, as shown in FIG. 6(*a*), the cross section at right angles to the lengthwise direction of the reinforcing yarn 22 having a region (p) 25*a* formed on its outer periphery was observed with an optical microscope, and in the cross section, two straight lines were drawn from a centroid PC of the reinforcing yarn 22 so as to sandwich a portion (T) facing the region (p) 25*a*, and the angle (x) sandwiched between the two lines was obtained. As shown in FIG. 6(*b*), in a case where there are two or more portions (T) facing the region (p) 25*a*, angles (the angle (x1) and the angle (x2) in FIG. 6(*b*)) corresponding to the respective portions (T) were measured, and the sum of them was obtained. The cross section observed was a cross section at a position where a linear region (q) formed along the direction crossing the reinforcing yarn 22 was not present.

Measurement was carried out by using an image analysis software with respect to cross sections at randomly selected 10 positions of the reinforcing yarn 22 having the region (p) 25*a* formed on the outer periphery. The average of angles measured with respect to the cross sections at the 10 positions was taken as the angle (x).

The angle (x) was measured with respect to an ion exchange membrane dried at 90° C. for 2 hours.

(Ratio [y2/(y1+y2)])

Observation with an optical microscope was carried out in the same manner as measurement of the angle (x), and the cross sectional area (y2) of the region (p) and the cross sectional area (y1) of the reinforcing yarn were obtained by using an image analysis software with respect to cross sections at randomly selected 10 points of the reinforcing yarn 22 and its outer peripheral region (p) 25*a*, and the average of the above-described ratios determined with respect to the cross sections at the 10 points was taken as the ratio [y2/(y1+y2)] (percentage).

The ratio [y2/(y1+y2)] was determined with respect to an ion exchange membrane dried at 90° C. for 2 hours.

(Thickness of Reinforcing Fabric) The thickness of the reinforcing fabric was measured by using a thickness measuring apparatus for fabric (manufactured by Mitsutoyo Corporation, "Thickness gage").

(Thickness of Ion Exchange Membrane)

The thickness of the ion exchange membrane was measured by using a thickness measuring apparatus (manufactured by Mitsutoyo Corporation, "Thickness gage") with respect to an ion exchange membrane dried at 90° C. for 2 hours.

(Electrolysis Voltage)

The ion exchange membrane was installed in a test electrolytic cell with an electrolytic surface size of 150 mm×100 mm so that the layer (C) faced the cathode, and electrolysis of an aqueous sodium chloride solution was conducted under conditions of a sodium hydroxide concentration of 32 mass %, a sodium chloride concentration of 200 g/L, a temperature of 90° C. and a current density of 8 kA/m², whereby the electrolysis voltage (V) was measured after 7 days from the initiation of operation.

Ex. 1

(Step (a))

TFE and a fluorinated monomer having a group convertible to a carboxylic acid functional group represented by the following formula (3-1) were copolymerized to synthesize a fluorinated polymer having groups convertible to carboxylic acid functional groups (ion exchange capacity: 1.06 meq/g dry resin, TQ: 225° C.) (hereinafter referred to as polymer C).

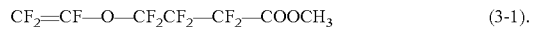

$$CF_2=CF-O-CF_2CF_2-CF_2-COOCH_3 \quad (3\text{-}1).$$

TFE and a fluorinated monomer having a group convertible to a sulfonic acid functional group represented by the following formula (4-1) were copolymerized to synthesize a fluorinated polymer having groups convertible to sulfonic acid functional groups (ion exchange capacity: 1.1 meq/g dry resin, TQ: 235° C.) (hereinafter referred to as polymer S).

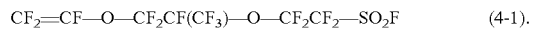

$$CF_2=CF-O-CF_2CF(CF_3)-O-CF_2CF_2-SO_2F \quad (4\text{-}1).$$

The polymer C and the polymer S were formed by a co-extrusion method to obtain a film A of a two layer structure with a precursor layer (C') (thickness: 12 μm) composed of the polymer C and a precursor layer (S'-1) (thickness: 68 μm) composed of the polymer S.

Further, the polymer S was formed by a melt extrusion method to obtain a film B (thickness: 30 μm) to be a precursor layer (S'-2).

A PTFE film was rapidly stretched and then slit to a thickness of 100 denier to obtain a monofilament, which was twisted 2,000 times/m to obtain a PTFE yarn, which was used as a core yarn (reinforcing yarn) of a covered twisted yarn.

A PET yarn made of a multifilament of 30 denier having twelve filaments of 2.5 denier stretch-assembled, was used as a wrap yarn of a covered twisted yarn.

The wrap yarn was singly wound on the core yarn 3,000 windings/m to obtain a covered yarn.

Further, a PET yarn made of a multifilament of 30 denier having six filament of 5 denier stretch-assembled, was used as a sacrificial yarn.

Plain weaving was conducted so that one reinforcing yarn and two sacrificial yarns would be alternately arranged, to obtain a reinforcing fabric (density of covered yarns: 27 yarns/inch, density of sacrificial yarns: 54 yarns/inch).

The film B, the reinforcing fabric, the film A and a release PET film (thickness: 100 μm) were overlaid in this order so that the layer (C') convertible to the film A was located on the release PET film side, and laminated by using a roll. The release PET film was peeled off.

A paste comprising 29.0 mass % of zirconium oxide (average particle diameter: 1 μm), 1.3 mass % of methyl cellulose, 4.6 mass % of cyclohexanol, 1.5 mass % of cyclohexane and 63.6 mass % of water, was transferred by a roll press on the precursor layer (S'-2) side to form a gas-releasing coating layer. The attached amount of zirconium oxide was 20 g/m². A precursor membrane of an ion exchange membrane was obtained in such a manner.

(Step (b))

The precursor membrane of an ion exchange membrane having the gas-releasing coating layer formed on one side, was immersed in an alkaline aqueous solution (containing 5 mass % of dimethyl sulfoxide and 30 mass % of potassium hydroxide) at 95° C. for 8 minutes.

Thus, —COOCH$_3$ of the polymer C and —SO$_2$F of the polymer S were hydrolyzed and converted to ion exchange groups, to convert the precursor layer (C') to the layer (C), the precursor layers (S'-1) and (S'-2) respectively to layers (S-1) and (S-2), and at least a portion of the sacrificial material (the wrap yarns of the covered yarns and the sacrificial yarns) in the reinforcing fabric was eluted.

In an ethanol solution containing 2.5 mass % of an acid-form polymer of polymer S, zirconium oxide (average particle diameter: 1 μm) was dispersed at a concentration of 13 mass %, to prepare a dispersion. The dispersion was sprayed on the layer (C) side of the membrane, to form a gas-releasing coating layer, to obtain an ion exchange membrane having gas-releasing coating layers formed on both surfaces. The attached amount of zirconium oxide on the layer (C) side was 3 g/m².

Ex. 2

An ion exchange membrane was obtained in the same manner as in Ex. 1 except that a multifilament of 30 denier having 6 filaments of 5 denier stretch-assembled was used as the wrap yarn, and the wrap yarn was singly wound on the core yarn at 1,500 windings/m to obtain a covered yarn.

Ex. 3

An ion exchange membrane was obtained in the same manner as in Ex. 1 except that a multifilament of 30 denier having 12 filaments of 2.5 denier stretch-assembled was used as the wrap yarn, and the wrap yarn was singly wound on the core yarn at 1,500 windings/m to obtain a covered yarn.

Ex. 4

An ion exchange membrane was obtained in the same manner as in Ex. 1 except that a multifilament of 30 denier having 12 filaments of 2.5 denier stretch-assembled was used as the wrap yarn, and the wrap yarn was double wound on the core yarn to form a covered yarn. The number of windings was 1,500 windings/m in each of the first and second windings.

Ex. 5

An ion exchange membrane was obtained in the same manner as in Ex. 1 except that a PTFE film was rapidly stretched and then slit to a thickness of 100 denier to obtain a monofilament, which was twisted 450 times/m to obtain a PTFE yarn, which was used as a core yarn (reinforcing yarn) of a covered twisted yarn, and a multifilament of 30 denier having 6 filaments of 5 denier stretch-assembled was used as a wrap yarn.

Ex. 6

A PTFE film was rapidly stretched and then slit to a thickness of 100 denier to obtain a monofilament, which was twisted 2,000 times/m to obtain a PTFE yarn, which was used as a reinforcing yarn.

A PET yarn made of a monofilament of 30 denier having 6 filaments of 5 denier stretched-assembled, was used as a sacrificial yarn.

Plain weaving was conducted so that one reinforcing yarn and two sacrificial yarns would be alternately arranged, to obtain a reinforcing fabric (density of reinforcing yarns: 27 yarns/inch, density of sacrificial yarns: 54 yarns/inch).

An ion exchange membrane was obtained in the same manner as in Ex. 1 except for the above.

Ex. 7

A PTFE film was rapidly stretched and then slit to a thickness of 100 denier to obtain a monofilament, which was twisted 450 times/m to obtain a PTFE yarn, which was used as a reinforcing yarn.

A PET yarn made of a monofilament of 30 denier having 6 filaments of 5 denier stretched-assembled, was used as a sacrificial yarn.

Plain weaving was conducted so that one reinforcing yarn and two sacrificial yarns would be alternately arranged, to obtain a reinforcing fabric (density of reinforcing yarns: 27 yarns/inch, density of sacrificial yarns: 54 yarns/inch).

An ion exchange membrane was obtained in the same manner as in Ex. 1 except for the above.

TABLE 1

| | | | Unit | Ex. 1 | Ex. 2 | Ex. 3 | Ex. 4 | Ex. 5 | Ex. 6 | Ex. 7 |
|---|---|---|---|---|---|---|---|---|---|---|
| Covered yarn | Core yarn (reinforcing yarn) | Fineness | Denier | 100 | 100 | 100 | 100 | 100 | 100 | 100 |
| | | Number of filaments | Number | 1 | 1 | 1 | 1 | 1 | 1 | 1 |
| | | Number of twisting | Times/m | 2000 | 2000 | 2000 | 2000 | 450 | 2000 | 450 |
| | | Density (number of implantation) | Yarns/inch | 27 | 27 | 27 | 27 | 27 | 27 | 27 |
| | Sacrificial material for covering (wrap yarn) | Fineness | Denier | 30 | 30 | 30 | 30 | 30 | — | — |
| | | Number of filaments | Number | 12 | 6 | 12 | 12 | 6 | — | — |
| | | Number of windings on core yarn | Windings/m | 3000 | 1500 | 1500 | 1500 | 3000 | — | — |
| | | Type of covered twisted yarn | | SC twisted yarn | SC twisted yarn | SC twisted yarn | DC twisted yarn | SC twisted yarn | — | — |

TABLE 1-continued

|  |  | Unit | Ex. 1 | Ex. 2 | Ex. 3 | Ex. 4 | Ex. 5 | Ex. 6 | Ex. 7 |
|---|---|---|---|---|---|---|---|---|---|
| Sacrificial yarn | Fineness | Denier | 30 | 30 | 30 | 30 | 30 | 30 | 30 |
|  | Number of filaments | Number | 6 | 6 | 6 | 6 | 6 | 6 | 6 |
|  | Density (number of implantation) | Yarns/inch | 54 | 54 | 54 | 54 | 54 | 54 | 54 |
| Reinforcing fabric | Thickness | μm | 191 | 170 | 189 | 211 | 149 | 120 | 97 |
| Ion exchange membrane | Angle (x) | Degree | 324 | 115 | 234 | 230 | 317 | 0 | 0 |
|  | Ratio [y2/(y1 + y2)] | % | 23 | 21 | 26 | 38 | 24 | 0 | 0 |
|  | Thickness | μm | 281 | 260 | 279 | 295 | 259 | 234 | 226 |
|  | Electrolysis voltage | V | 3.27 | 3.30 | 3.29 | 3.28 | 3.31 | 3.32 | 3.35 |

SC twisted yarn: single covered twisted yarn
DC twisted yarn: double covered twisted yarn As shown in Table 1, the ion exchange membrane in each of Ex. 1 to 5 produced by using a reinforcing fabric formed by weaving covered yarns and sacrificial yarns provided a low electrolysis voltage as compared with the ion exchange membrane in each of Ex. 6 and 7 produced by using a reinforcing fabric formed by weaving reinforcing yarns and sacrificial yarns, without using covered yarns.

Further, it was found that the higher the angle (x), the more the electrolysis voltage lowered, for example, from the comparison between Ex. 1 to 3.

INDUSTRIAL APPLICABILITY

The process for producing an ion exchange membrane for electrolysis, the ion exchange membrane for electrolysis, the precursor membrane of an ion exchange membrane for electrolysis, and an electrolysis apparatus comprising an ion exchange membrane for electrolysis of the present invention can be used for electrolysis in a wide range, such as water electrolysis of electrolyzing an aqueous alkali hydroxide solution such as an aqueous alkali chloride solution.

This application is a continuation of PCT Application No. PCT/JP2016/061696, filed on Apr. 11, 2016, which is based upon and claims the benefit of priority from Japanese Patent Application No. 2015-081944 filed on Apr. 13, 2015. The contents of those applications are incorporated herein by reference in their entireties.

REFERENCE SYMBOLS

1: Ion exchange membrane for alkali chloride electrolysis, 1A: precursor membrane of ion exchange membrane for alkali chloride electrolysis, 10: electrolyte membrane, 12: layer (C), 12A: precursor layer (C'), 14: layer (S-2), 14A: precursor layer (S'-2), 15: layer (S-1), 15A: precursor layer (S'-1), 20: reinforcing material, 20A: reinforcing fabric, 21: covered yarn, 22: reinforcing yarn, 23: wrap yarn, 24: sacrificial yarn, 25a: region (p), 25b: region (q), 100: alkali chloride electrolysis apparatus, 112: cathode, 114: anode, 110: electrolytic cell, 121: aqueous NaCl solution, 122: dilute aqueous NaCl solution, 123: aqueous NaOH solution.

What is claimed is:

1. A process for producing an ion exchange membrane, the process comprising:
   (a) embedding, in a fluorinated polymer having groups convertible to ion exchange groups, a reinforcing fabric formed by weaving covered yarns each comprising a reinforcing yarn and a sacrificial material covering at least a portion of the outer peripheral surface of the reinforcing yarn, to produce a precursor membrane of an ion exchange membrane; and
   (b) eluting, from the precursor membrane, at least a portion of the sacrificial material in the reinforcing fabric to form a reinforcing material and at the same time, converting the groups convertible to ion exchange groups to ion exchange groups;
   wherein between the outer peripheral surface of at least a portion of the reinforcing yarns and the fluorinated polymer, a region (p) which is either a region (p1) formed by a void or a region (p2) formed by a void and the sacrificial material, is continuously formed along an entire length of the reinforcing yarn.

2. The process of claim 1, therein the covered yarns are covered twisted yarns each having the reinforcing yarn as a core yarn and a wrap yarn composed of the sacrificial material wound on at least a portion of the outer peripheral surface of the core yarn.

3. The process of claim 1, wherein the region (p) is formed in a tubular form along the longitudinal direction of the reinforcing yarn on the outer peripheral surface of the reinforcing yarn or is formed in a spiral form so as to be wound on the outer peripheral surface of the reinforcing yarn.

4. The process of claim 1, wherein in a cross section at right angles to the lengthwise direction of at least a portion of the reinforcing yarns, the following angle (x) of a portion facing the region (p) based on the outer periphery of the reinforcing yarn, is from 60 to 360°:
   angle (x): an angle formed by two lines drawn from a centroid Pc of the reinforcing yarn in the cross section so as to sandwich a portion (T) facing the region (p) formed on the outer peripheral surface of the reinforcing yarn; in a case where there are two or more portions (T), the angle (x) is the sum of the angles corresponding to the respective portions (T); and in a case where the portion (T) is present on the entire outer periphery of the reinforcing yarn, the angle (x) is 360°.

5. The process of claim 1, wherein in a cross section at right angles to the lengthwise direction of at least a portion of the reinforcing yarns, the ratio of a cross sectional area (y2) of the region (p) formed on the outer periphery of the reinforcing yarn to the sum of a cross sectional area (y1) of the reinforcing yarn and the cross sectional area (y2) of the region (p), i.e. [y2/(y1+y2)] is from 5 to 50%.

6. The process of claim 1, wherein the thickness of the reinforcing fabric is from 10 to 300 μm.

7. The process of claim 1, wherein the reinforcing fabric is a reinforcing fabric formed by weaving the covered yarns and sacrificial yarns composed of the sacrificial material, and at least a portion of the sacrificial yarns is eluted in (b).

8. A process of electrolyzing an aqueous alkali chloride solution, the process comprising contacting the aqueous alkali chloride solution with an ion exchange membrane obtained by the process of claim 1.

* * * * *